United States Patent

Shimizu et al.

[19]

[11] Patent Number: 6,037,426
[45] Date of Patent: Mar. 14, 2000

[54] PROCESS FOR PRODUCING A POLYMER BY POLYMERIZATION OF A MONOMER HAVING AN ETHYLENIC DOUBLE BOND

[75] Inventors: Toshihide Shimizu, Urayasu; Mikio Watanabe, Hasaki-machi; Genji Noguki, Itako-machi, all of Japan

[73] Assignee: Shin-Etsu Chemical Co., Ltd., Tokyo, Japan

[21] Appl. No.: 09/244,414

[22] Filed: Feb. 4, 1999

[30] Foreign Application Priority Data

Feb. 5, 1998 [JP] Japan .................................. 10-039606

[51] Int. Cl.[7] .............................. C08F 2/00; C08G 85/00
[52] U.S. Cl. ................................ 526/62; 526/72; 526/74; 526/90; 526/123; 526/135; 526/344; 428/423.1; 428/425.3; 428/458; 428/524; 428/704
[58] Field of Search ................................ 526/62, 72, 74, 526/90, 123, 344, 135; 428/423.1, 425.3, 458, 524, 704

[56] References Cited

U.S. PATENT DOCUMENTS

| 4,024,301 | 5/1977 | Witenhafer et al. ................... 427/230 |
| 4,024,330 | 5/1977 | Morningstar et al. ..................... 526/62 |
| 4,081,248 | 3/1978 | Cohen ........................................ 23/285 |
| 5,115,051 | 5/1992 | Shimizu et al. ........................... 526/62 |
| 5,416,174 | 5/1995 | Shimizu et al. ........................... 526/62 |

FOREIGN PATENT DOCUMENTS

| 0 008 799 | 3/1980 | European Pat. Off. . |
| 0 372 996 | 6/1990 | European Pat. Off. . |
| 0 574 155 | 12/1993 | European Pat. Off. . |
| 64-5044 | 1/1989 | Japan . |

*Primary Examiner*—Samuel A. Acquah
*Attorney, Agent, or Firm*—Oblon, Spivak McClelland, Maier & Neustadt, PC

[57] ABSTRACT

An improved process for producing a polymer by polymerizing a monomer having an ethylenic double bond in a polymerization vessel having a polymer scale preventive coating film on its inner wall surfaces, etc. is provided. The coating film is formed by coating a first coating liquid containing a compound selected from the group consisting of an aromatic compound having 5 or more conjugated $\pi$ bonds and a heterocyclic compound having 5 or more conjugated $\pi$ bonds, and then coating a second coating liquid on the first layer. The first and second coating liquids are applied by means of steam as a carrier. The second layer has a surface having a contact angle to water of less than 60° after its surface has been brought into contact with a solution of mixture of water and a vinyl chloride monomer in a weight ratio of 1:1, at 50° C. for 1 hour. This process can shorten the time for forming the coating film to improve productivity, can improve the effect of preventing adhesion of polymer scale, can make colored particles less mix into polymer products obtained by this process, can lessen fish eyes and initial discoloring of formed products and can improve the quality of polymeric products and their formed or molded products.

19 Claims, 2 Drawing Sheets

PROCESS FOR PRODUCING A POLYMER BY POLYMERIZATION OF A MONOMER HAVING AN ETHYLENIC DOUBLE BOND

BACKGROUND OF THE INVENTION

1. Field of the Invention

This invention relates to a polymerization production process that can prevent polymer scales from adhering to polymerization vessel inner wall surfaces and others and can produce polymers having a good quality, in a process for producing a polymer by polymerizing in a polymerization vessel a monomer having an ethylenic double bond.

2. Description of the Prior Arts

As known in processes for producing polymers by polymerizing monomers in polymerization vessels, there is a problem that polymers may adhere to polymerization vessel inner wall surfaces and others in the form of scales.

Such polymer scales having adhered to polymerization vessel inner wall surfaces and others may cause a decrease in yield of polymers, a decrease in cooling capacity of polymerization vessels, and a lowering of product quality when polymer scales having adhered come off to mix into polymer products, and also may bring about a disadvantage that much labor and time must be taken to remove the polymer scales.

Moreover, since the polymer scales contain unreacted monomers, there is a possibility that operators are exposed to them to cause physical disorder.

Accordingly, in the polymerization of monomers having ethylenic double bonds, in order to prevent polymer scales from adhering to polymerization vessel inner wall surfaces and others, methods of preventing the adhesion of polymer scales by one-stage coating (hereinafter "one-stage coating method") are proposed, as exemplified by a method in which a polar organic compound such as an amine compound, a quinone compound or an aldehyde compound or a dye or pigment is coated as a "polymer scale preventive agent" on polymerization vessel inner wall surfaces, stirrers and so forth (Japanese Patent Publications (kokoku) Nos. 45-30343 and 45-30835), a method in which a polar organic compound or dye treated with a metal salt is coated (Japanese Patent Publication (kokoku) No. 52-24953, a method in which a mixture of an electron-donating compound and an electron-accepting compound is coated (Japanese Patent Publication (kokoku) No. 53-28347), a method in which a condensation reaction product of 1-naphthol with formaldehyde is coated (Japanese Pre-examination Patent Publication (kokai) No. 57-164107), a method in which a condensation reaction product of a phenol compound with formaldehyde is coated (Japanese Pre-examination Patent Publication (kokai) No. 57-192413), a method in which a polyaromatic amine is coated (Japanese Patent Publication (kokoku) No. 59-16561), a method in which a self-condensation product of a polyhydric phenol or a self-condensation product of a polyhydric naphthol is coated (Japanese Pre-examination Patent Publication (kokai) No. 54-7487), a method in which a condensation reaction product of a ketone resin with a phenol compound is coated (Japanese Pre-examination Patent Publication (kokai) No. 62-236804), a method in which a condensation reaction product of an aromatic amine with an aromatic nitro compound and a paste material thereof are coated (Japanese Patent Publication (kokoku) No. 60-30681), and a method in which a condensation reaction product of an aromatic amine with a quinone compound is coated (Japanese Pre-examination Patent Publication (kokai) No. 61-7309).

In the case of polymer scale preventive coating films obtained by such one-stage coating methods, scales tend to adhere to the vicinity of a gas-liquid boundary surface in the polymerization vessel during polymerization, or, depending on the composition of a polymerization reaction mixture, scales tend to adhere to the whole wall surface. Accordingly, to prevent this, it is known to mix in a coating liquid containing the polymer scale preventive agent a water-soluble polymeric compound such as an amphoteric polymeric compound, a cationic polymeric compound or a hydroxyl-group-containing polymeric compound; an inorganic colloid; or a substance having no affinity for monomers, as exemplified by an inorganic salt such as an alkali metal salt (hereinafter "polymer scale preventive auxiliary agent"). These one-stage coating methods are effective for preventing the adhesion of polymer scales when monomers having ethylenic double bonds are polymerized in polymerization vessels.

In instances where no sufficient polymer scale prevention effect can be obtained by the one-stage coating method, a method of preventing the adhesion of polymer scales by two-stage coating (hereinafter "two-stage coating method") is proposed, which comprises a) coating a coating liquid containing the polymer scale preventive agent as described above, to form a first layer, and b) coating further thereon a coating liquid containing the above polymer scale preventive auxiliary agent, to form a second layer (Japanese Pre-examination Patent Publication (kokai) Nos. 3-74404, 2-80403, 2-80402, 2-80401 and 2-47102).

In both the above one-stage coating method and two-stage coating method for preventing the adhesion of polymer scales, spray coating is usually used as a coating process in view of productivity including operability.

In the one-stage coating method of coating the polymer scale preventive agent by spray coating, the coating film is formed by a process comprising the following steps 1 to 3.

Step 1: A coating liquid containing the polymer scale preventive agent is coated on the polymerization vessel inner wall surface and other surfaces with which monomers come into contact.

Step 2: The coated surfaces are dried to form a dry film.

Step 3: The surface of the coating film thus formed is washed to remove any excess coating liquid.

In the two-stage coating method comprising coating the polymer scale preventive agent and coating the polymer scale preventive auxiliary agent both by spray coating, the coating film formation comprising the same steps 1 to 3 as the above is operated also in the second-stage coating.

When the above spray coating is used, the surfaces of baffles and stirring blades that face polymerization vessel inner wall surfaces stand within the dead angle from a spray nozzle. Since it is hard for the coating liquid to reach the surfaces of such portions standing blind or hidden from the spray nozzle, the polymer scale preventive agent can not be coated thereon in the same way as on the surfaces not standing blind. Thus, it is difficult to form a uniform coating film over the surfaces standing blind and the surfaces not standing blind. If a coating film in a quantity effective enough to prevent the adhesion of polymer scales is intended to be formed also on the blind surfaces, it can not avoid using a coating liquid containing the polymer scale preventive agent in a larger quantity than that for the other surfaces. It follows that an unnecessarily excess preventive agent is applied on the surfaces not standing blind. Hence, the coating film thus formed have had an uneven coating thickness and the coating film have had a larger thickness locally than is necessary.

The formation of polymer scale preventive coating films by spray coating has also had the following problems.

(1) Usually, the coating film comprising the polymer scale preventive agent is formed previously for each polymerization batching. Since it is common for the polymer scale preventive agent to have a color, the polymer scale preventive agent is repeatedly coated as the polymerization is batched repeatedly in a larger number, so that the coating film may have a large thickness at some part. The part having such a thick coating film may come off to become included into the reaction mixture, or the scale preventive agent may be coated on polymer scales having already adhered to the polymerization vessel inner wall surfaces and others and may come off together with a part of the scales to mix into the resultant polymerization products. This may cause colored particles or fish eyes brought in their formed products or may cause a low product quality such as a high initial discoloring of formed products, disadvantageously.

(2) As stated above, the effect of preventing adhesion of polymer scales at the surfaces standing blind or hidden in the polymerization vessel, standing within the dead angle from the spray nozzle, can not be said to be so much sufficient, considering the polymer scale preventive agent applied in a fairly larger quantity than that on other surfaces.

(3) The spray coating requires a drying step of drying the coated surfaces, and takes a time necessary for forming the coating film of the polymer scale preventive agent. Accordingly, in respect of an improvement of productivity, it is sought to shorten the time necessary for forming the coating film.

As a measure for eliminating the above disadvantages in the spray coating, a method is proposed in which a coating liquid containing a polymer scale preventive agent is coated using steam as a carrier (hereinafter "steam coating") (Japanese Patent Publication (kokoku) No. 1-5044. As the coating liquid in this method, used is a coating liquid comprised of the polymer scale preventive agent alone or a coating liquid to which the polymer scale preventive auxiliary agent is further added.

This steam coating has the following advantages.

(1) A thin and uniform coating film of the polymer scale preventive agent, necessary for preventing the adhesion of scales effectively can be formed using the coating liquid in a small quantity.

(2) The coating film of the polymer scale preventive agent, necessary for achieving the scale prevention effect can be formed using the coating liquid in a small quantity, also on the portions standing blind or hidden in the polymerization vessel, standing within the dead angle from the spray nozzle. Thus, the polymer scale prevention effect can be attained also on these portions.

(3) The drying step is unnecessary in the coating film forming step, so that the time necessary for forming the coating film of the polymer scale preventive agent can be shortened.

Incidentally, in the steam coating, the coating liquid and steam are mixed so that the coating liquid is carried by the steam and can be applied to the polymerization vessel inner wall surfaces and others. Accordingly, the concentration of the polymer scale preventive agent in the coating liquid is set taking account of the fact that the solution is diluted with steam. Usually, the concentration of the polymer scale preventive agent in the coating liquid for steam coating is set 4 to 40 times that of the one for spray coating, although the amount of a polymer scale preventive agent necessary in steam coating is approximately equivalent to that necessary in spray coating.

In contrast to the advantages, the steam coating has problems on the following points.

(1) Although the steam coating enables uniform coating in a polymerization vessel, the deposition of scale can be prevented insufficiently around the interface between the gas-liquid phases.

(2) As the result of the insufficient prevention of scale deposition around the interface between gas-liquid phases, the polymer scale deposition will grow around the interface with repetition of polymerization runs. A part of the grown deposited scale may peel off the inner surfaces of the polymerization vessel during polymerization and be incorporated into a polymer product to cause formation of fisheyes.

(3) A polymer scale preventive agent is coated on the inner surfaces of a polymerization vessel repeatedly as polymerization runs are repeated. Consequently, the layer of the polymer scale preventive agent become thicker gradually. A part of the thick layer of the agent may peel off during polymerization and be incorporated into polymer products to cause colored particles. The colored particles will lower anti-initial discoloration properties, particularly luminosity index L, of polymer products.

SUMMARY OF THE INVENTION

An object of the present invention is to provide a process for producing a polymer by polymerizing a monomer having an ethylenic double bond, which can shorten the time for forming coating films of polymer scale preventive agents to improve productivity, can improve the effect of preventing adhesion of polymer scales, can make colored particles less mix into polymer products obtained by this process, can lessen fish eyes and initial discoloring of formed products and can improve the quality of polymeric products and their formed or molded products.

The above subject can be settled by a process for producing a polymer by polymerizing in a polymerization vessel a monomer having an ethylenic double bond, wherein said polymerization vessel has a polymer scale preventive coating film on its inner wall surfaces and other surfaces with which the monomer comes into contact during polymerization;

said coating film comprising a first layer formed on said inner wall surfaces and other surfaces and a second layer formed on the first layer;

said first layer being formed by coating a first coating liquid containing a compound selected from the group consisting of an aromatic compound having 5 or more conjugated π bonds and a heterocyclic compound having 5 or more conjugated π bonds by means of steam as a carrier, and said second layer being formed by coating a second coating liquid on the first layer by means of steam as a carrier; and said second layer having a surface having a contact angle to water of less than 60° after its surface has been brought into contact with a solution of mixture of water and a vinyl chloride monomer in a weight ratio of 1:1, at 50° C. for 1 hour.

According to the polymerization process of the present invention, the time for forming coating films of polymer scale preventive agents can be shortened to improve productivity, and also, when monomers having an ethylenic double bond are polymerized, polymer scales can be prevented effectively from adhering to not only wall surfaces at the liquid-phase portion in the polymerization vessel but also stirrers, baffle surfaces facing the wall surface, and the vicinity of the boundary surface between the gaseous phase and the liquid phase. Hence, the quality of polymer products can be improved and the colored particles can be made less mix into polymers, and also formed products obtained by forming the polymers into sheets can be made to have very less fish eyes and also have good anti-initial discoloring.

BRIEF DESCRIPTION OF THE DRAWINGS

In the accompanying drawings.

DETAILED DESCRIPTION OF THE PREFERRED EMBODIMENTS

Figure 1:
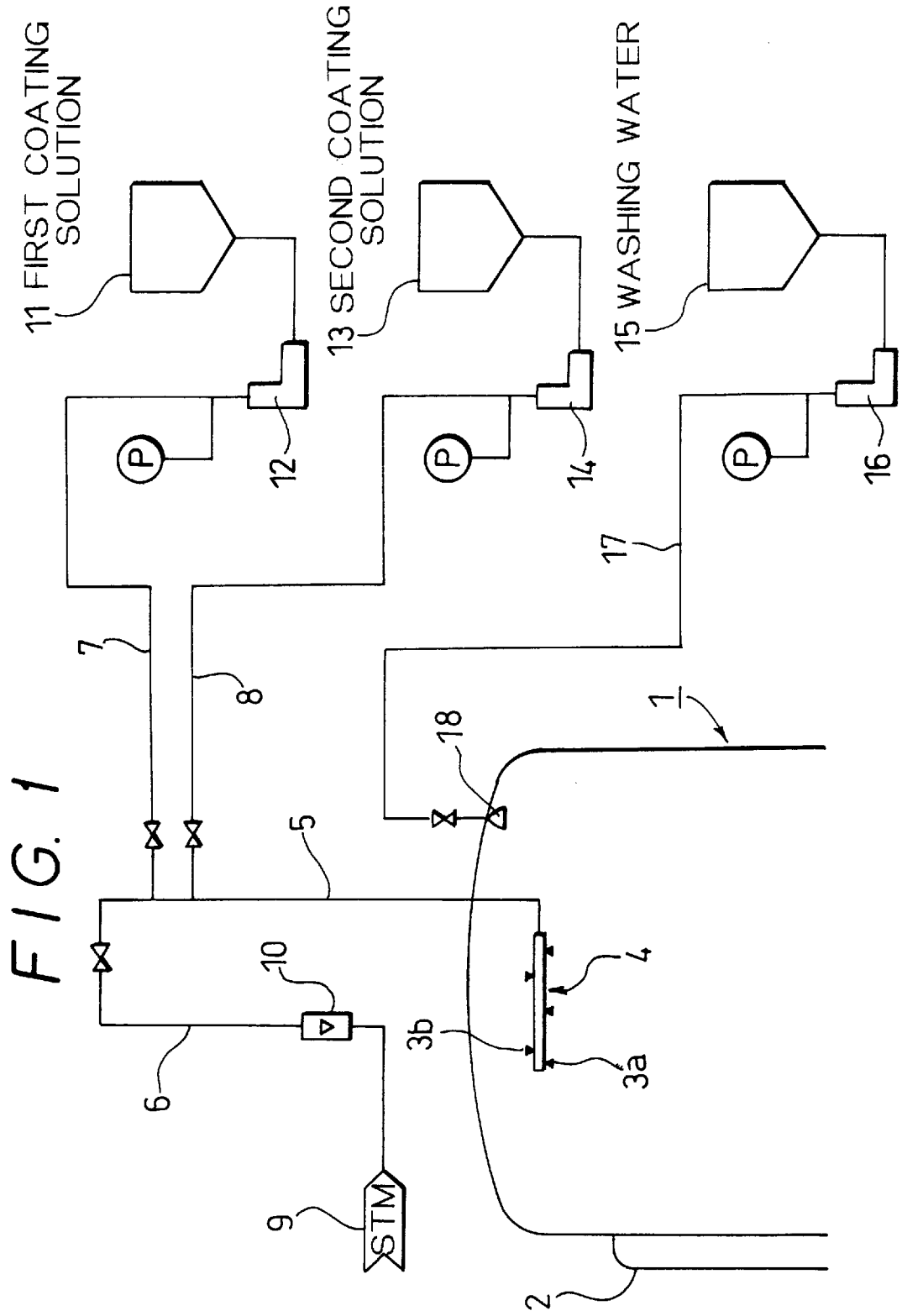
FIG. 1 schematically illustrates the arrangement in a polymerization apparatus.

The present invention will be described below in detail. In the following, the polymer scale preventive agent is often called simply as "anti-scale agent".

The scale-preventive coating film formed in the present invention comprises a first layer formed on the polymerization vessel inner wall surfaces and others and a second layer formed on the first layer.

[Coating-Film First Layer]

The aromatic compound and heterocyclic compound used in the first-layer forming coating liquid each have 5 or more conjugated π bonds. In the present specification, the term "π bonds" is meant to be double bonds and triple bonds, including, e.g., C=C, C≡C, N=N, C=N, C=S and C=O, and the term "conjugated π bonds" is meant to be a series of π bonds wherein each pair of adjacent π bonds are connected to each other through a single bond and all of the π bonds have a mutually conjugated relationship with each other. The aromatic compound having 5 or more conjugated π bonds and the heterocyclic compound having 5 or more conjugated π bonds are herein called together generically as "conjugated π bond compound" in some cases. The 5 or more π bonds are present in the conjugated π bond compound may form a single conjugation group or two or more conjugation groups.

Aromatic compound having 5 or more conjugated π bonds:

The aromatic compound having 5 or more conjugated π bonds may include benzene derivatives, naphthalene derivatives, polynuclear aromatic compounds, quinones, non-benzene type aromatic compounds, and aromatic compound condensation products having a weight-average molecular weight, which term herein means weight-average molecular weight in terms of polystyrene as measured by gel permeation chromatography, of 500 or more.

First, as benzene derivatives, there may be included:

phenols and derivatives thereof, such as 3,7-dioxy-10-methylxanthene and oxyanthraquinone;

aromatic amines and derivatives thereof, such as quinoline, carbazole, o-phenanthroline, p-phenanthroline, 3,6-diaminoacridine, 3-aminophenothiazine, 2-aminophenazine, phenothiazine, 2-oxy-4-methyl-quinoline;

nitro and nitroso derivatives, such as phenazine, phenazine oxide, 1-phenylazo-2-naphthol, Triphenylendioxadine and 4-nitroxanthone;

aromatic aldehydes, such as benzoflavin;

benzene derivatives having further one substituent other than aldehyde group, such as 1-oxy-2,4-dimethyl-fluorone, 3-phenylcoumarone, ethyl coumarine-3-carboxylate, 3-acetylcoumarine, 5-chloro-3-(4-oxyphenyl)anthranyl and 3-nitroacridone;

benzene derivatives having further one substituent other than acyl group, such as xanthone, 2-benzoylxanthone, xanthene and fluorene;

benzene derivatives and toluene derivatives having three or more different substituents, such as 7-acetoxy-8-methoxy-3-(2-nitrophenyl)carbostyryl; and aralkyl compounds, such as 9-benzylacridine;

diazo compounds and azo compounds, such as 1,1'-azonaphthalene and azoxyphenol.

Next, as naphthalene derivatives, there may be included:

alkyl, alkenyl and phenylnaphthalenes, such as 2-methylnaphthalene, 1-ethyl-naphthalene, 2-ethylnaphthalene and 1,2-dimethylnaphthalene;

dinaphthyls, such as 1,1'-dinaphthyl, 1,2'-dinaphthyl and 2,2'-dinaphthyl;

naphthylarylmethanes, such as 1-benzylnaphthalene, 2-benzylnaphthalene, 1-(α,α-dichlorobenzyl) naphthalene, diphenyl-α-naphthyl-methane, diphenyl-β-naphthylmethane and di-α-naphthylmethane;

naphthylarylethanes, such as 1,2-di-α-naphthylethane and 1,2-di-β-naphthylethane;

hydronaphthalenes such as 1,2-dihydronaphthalenes, 1,4-dihydronaphthalene and 1,2,3,4-tetrahydronaphthalene;

nitronaphthalenes and derivatives thereof, such as nitromethyl-naphthalene, nitroalkylnaphthalene, nitrophenyl-naphthalene, halo-nitronaphthalene, halo-dinitro-naphthalene, nitrosonaphthalene, diaminonaphthalene, triaminonaphthalene and tetraaminonaphthalene;

halogenated naphthalenes, such as 1-fluoro-naphthalene, 1-chloronaphthalene and 1-chloro-3,4-dihydronaphthalene; naphthylhydroxylamines, naphthylpyrazines and naphthylureas, such as α-naphthylhydroxylamine, β-naphthylthiohydroxylamine, N-nitroso-α-naphthylhydroxylamine, α-naphthylhydrazine and 1,2-dibenzocarbazole;

naphthalene-based aralkyl compounds, such as dibenzoanthracene, acenaphthene, diphenylnaphthylchloromethane and nitromethylnaphthalene;

naphthoaldehydes and derivatives thereof, such as α-naphthoaldehyde and 2-(2,4-dinitrophenyl)-1-(α-naphthyl)-ethylene;

acetonaphthenes and benzoylnaphthenes, such as 1,2:5,6-dibenzanthracene, 2'-methyl-2,1'-dinaphthyl ketone, 2-methyl-1,1'-dinaphthyl ketone and styryl-2-naphthyl ketone.

As the polynuclear aromatic compounds, there may be included:

anthracenes and derivatives thereof, such as anthracene, 1,2-dihydroanthracene, 1-chloroanthracene, 1,4-dichloroanthracene, 1-nitroanthracene, 9,10-dinitroanthracene, 1-aminoanthracene, 2-dimethylaminoanthracene, 2-anilinoanthracene, 9-methylamino-anthracene, 1,4-diaminoanthracene;

phenanthrenes and derivatives thereof, such as phenanthrene, 9,10-dihydrophenanthrene, 1,2,3,4-tetrahydrophenanthrene and 1-chlorophenanthrene;

phenanthrenequinones, such as phenanthrene-1,2-quinone and phenanthrene-1,4-quinone; and polynuclear aromatic compounds and derivatives thereof, such as pentacene, hexacene, benzophenanthrene, benzo[a]anthracene, pyrene and coronene.

As quinones and derivatives thereof, there may be included:

naphthoquinones and derivatives thereof, such as 1,2-naphthoquinone, 3-oxy-2,2'-binaphthyl-1,4;3',4'-diquinone, 5,6-benzoquinoxaline, 1,2-benzophenazine, 2-benzoazo-1-naphthol, 4-(2,4-dioxyphenyl)-1,2-dioxynaphthalene, 4-(3,4,5-trioxyphenyl)-1,2-dioxynaphthalene and 1,4-naphthol; and anthraquinones and derivatives thereof, such as 1,2-anthraquinone, 2,3-anthraquinone, 1,4-anthraquinone, alizarin, quinizarin, chrysazin, hystazarin, anthraflavin, isoanthraflavin, anthragallol, purpurin, oxyanthrarufin, oxychrysazin, oxyflavopurpurin, quinazarin, alizarinpentacyanine and purpurin.

Further, as the non-benzene aromatic compounds, there may be included, for example, azulene, cyclodecapentane, cyclotetradecaheptane, cyclooctadecanonaene, cyclotetracosadodecaene, heptalene, fulvalene, sesquifulvalene, heptafluvalene and perinaphthene.

The aromatic compound condensation products having a molecular weight of 500 or more may suitably be aromatic compound condensation products having preferably a weight-average molecular weight of from 500 to 70,000, and more preferably from 1,500 to 30,000.

Preferred aromatic compound condensation products include the compounds below, for instance.

Aldehyde Compound/Aromatic Hydroxyl Compound Condensation Products

The aldehyde compound/aromatic hydroxyl compound condensation product is a condensation product of an aldehyde compound with an aromatic hydroxyl compound. The use of such aldehyde compound/aromatic hydroxyl compound condensation products in polymer scale preventive agents are disclosed in, for example, Japanese Pre-examination Patent Publication (kokai) No. 57-192413, Japanese Patent Publication (kokoku) No. 6-62709, Japanese Pre-examination Patent Publication (kokai) No. 57-164107 and WO98/24820

The aldehyde compounds include, for example, formaldehyde, acetaldehyde, propionaldehyde, butylaldehyde, acrolein, crotonaldehyde, benzaldehyde, furfural, phenylacetaldehyde, 3-phenylpropionaldehyde and 2-phenylpropionaldehyde. From industrial and economical viewpoints, formaldehyde and acetaldehyde are advantageous.

The aromatic hydroxyl compounds include, for example, dihydroxybiphenyl compounds, naphthol compounds, phenol compounds, tannins and dimeric compounds of 2,3-dihydroxynaphthalene.

Examples of the dihydroxyphenyl compounds include 2,2'-dihydroxybiphenyl, 2,2'-dihydroxy-5,5'-dimethylbiphenyl, 2,2'-dihydroxy-4,4',5,5'-tetramethylbiphenyl, 2,2'-dihydroxy-5,5'-dichlorobiphenyl, 2,2'-dihydroxy-5,5'-dichlorohexylbiphenyl and 2,2'-dihydroxy-5,5'-di-tert-butylbiphenyl. In particular, from an industrial viewpoint, 2,2'-dihydroxybiphenyl is preferred.

Examples of the naphthol compounds include 1-naphthol, 2-naphthol, 1,3-dihydroxynaphthalene, 1,5-dihydroxynaphthalene, 1,7-dihydroxynaphthalene, 6-hydroxy-2-naphthoic acid, 2-hydroxy-1-naphthoic acid, 1-hydroxy-2-naphthoic acid and 1-hydroxy-8-naphthoic acid.

Examples of the phenol compounds include phenol, cresol, pyrogallol, hydroxyhydroquinone, resorcin, catechol, hydroquinone, bisphenol-A, hydroxybenzoic acid, dihydroxybenzoic acid, 2-hydroxy-5-methoxybenzoic acid and salicylic acid.

Examples of the tannins include tannic acid, Chinese gallotannin, Turkish gallotannin, sumac tannin, quebracho tannin, and tannin of persimmon (shibuol).

The dimeric compounds of 2,3-dihydroxynaphthalene include, for example, 2,3,2',3'-tetrahydroxybinaphthyl.

The above condensation product of an aldehyde compound with an aromatic hydroxyl compound can be produced by reacting these reactive components in a suitable medium in the presence of a catalyst, usually at room temperature to 200° C. for 2 to 100 hours, preferably at 30 to 150° C. for 3 to 30 hours. Each of the aromatic hydroxyl compound and the aldehyde compound can be used singly or in combination of two or more kinds.

The medium in which the above condensation reaction is carried out includes, for example, water; andorganic solvents, such as alcohols, ketones and esters. The organic solvents include, for example, alcohols, such as methanol, ethanol and propanol; ketones, such as acetone and methyl ethyl ketone; and esters, such as methyl acetate and ethyl acetate.

The medium in which the above condensation reaction is carried out has a pH in the range of usually from 1 to 13, and pH adjusters may be used without any particular limitations.

The catalyst used in the above condensation reaction includes, for example, acidic catalysts, such as sulfuric acid, hydrochloric acid, perchloric acid, p-toluenesulfonic acid, methanesulfonic acid and trifluoromethanesulfonic acid; and basic catalysts, such as NaOH, KOH and $NH_4OH$.

The ratio of the aldehyde to the aromatic hydroxyl compound used when the condensation reaction is carried out depends on the types of the aldehyde compound, aromatic hydroxyl compound, solvent and catalyst used, the reaction time, the reaction temperature and so forth. Generally, it is preferable to use from 0.1 to 10 mols of the aldehyde compound per mol of the aromatic hydroxyl compound.

Pyrogallol/Acetone Condensation Products

The pyrogallol/acetone condensation product is a condensation product of pyrogallol with acetone, the molar ratio of the pyrogallol to the acetone being in the range of usually from 1/0.1 to 1/10, and the melting point thereof being usually from 100 to 500° C. The melting point increases with an increase in molecular weights. For example, melting points of from 160 to 170° C. correspond to molecular weights of from 1,450 to 1,650; and melting points of from 200 to 220° C., to molecular weights of from 2,600 to 4,000. The use of such pyrogallol/acetone condensation products in polymer scale preventive agents is disclosed in, for example, Japanese Pre-examination Patent Publication (kokai) No. 4-328104.

The pyrogallol/acetone condensation product can be produced by dissolving pyrogallol in acetone, and condensing them in the presence of a condensation catalyst. The pyrogallol is used in an amount of usually from 1 to 100 parts by weight per 100 parts by weight of the acetone. As the condensation catalyst, for example, phosphorus oxychloride is used. The reaction may be carried out at room temperature to 100° C.

Polyhydric Phenol Self-Condensation Products and Polyhydric Naphthol Self-Condensation Products Polyhydric phenols are exemplified by catechol, resorcinol, chlororesorcinol, hydroquinone, phloroglucinol and pyrogallol; dihydroxytoluene and xylene; trihydroxytoluene and trihydroxyxylene; ethyl-di-, propyl-di-, butyl-di- or pentyl-di-hydroxybenzene; and trihydroxybenzene. Polyhydric naphthols are exemplified by naphthol derivatives, such as 1,3-, 1,4-, 1,5- or 1,7-dihydroxynaphthalene. The use of such polyhydric phenol self-condensation products and polyhydric naphthol self-condensation products in polymer scale preventive agents is disclosed in, for example, Japanese Pre-examination Patent Publication (kokai) No. 54-7487.

The polyhydric phenol self-condensation product or polyhydric naphthol self-condensation product can be produced by heating polyhydric phenol or polyhydric naphthol in an inert atmosphere, such as nitrogen, argon or the like, at a temperature ranging from 200 to 350° C. for 4 to 100 hours. In this reaction, various catalysts may be used, as exemplified by zinc chloride, aluminum chloride and sodium hydroxide.

Aromatic Amine Compound Condensation Products

The aromatic amine compound condensation products include, for example;

(1) a self-condensation product of an aromatic amine compound;
(2) a condensation product of an aromatic amine compound with a phenol compound;
(3) a condensation product of an aromatic amine compound with an aromatic nitro compound; and
(4) a basic product obtained by making basic a condensation product of an aromatic amine compound with an aromatic nitro compound by the use of an alkali metal salt or an ammonium compound.

The use of such aromatic amine compound condensation products is disclosed in, for example, Japanese Patent Publication (kokoku) Nos. 59-16561 and 60-30681.

The aromatic amine compounds are exemplified by aniline, o-, m- or p-phenylenediamine, o-, m- or p-aminophenol, o-, m- or p-chloroaniline, p-aminobenzene, 2,4-diaminoazobenzene, p-aminoacetanilide, o-, m- or p-methylaniline, N,N-dimethyl-p-phenylenediamine, 4-chloro-o-phenylenediamine, 4-methoxy-o-phenylenediamine, 2-amono-4-chlorophenol, 2,3-diaminotoluene, 2,4-diaminophenol, and diphenylamines such as 4-aminodiphenylamine, 2-aminodiphenylamine, 4,4'-diaminodiphenylamine, 4-amino-3'-methoxydiphenylamine and 4-amino-4'-hydroxydiphenylamine.

The phenol compounds are specifically exemplified by phenol, hydroquinone, resorcinol, catechol, hydroxyhydroquinone, pyrogallol, o-, m- or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid and 2,5-, 2,6- or 3,5-dihydroxytoluene.

The aromatic nitro compounds are exemplified by nitrobenzene, o-, m- or p-hydroxynitrobenzene, o-, m- or p-nitroanisole, o-, m- or p-nitrophenetole, o-, m- or p-chloronitrobenzene, o-, m- or p-aminonitrobenzene, o-, m- or p-nitrobenzoic acid, o-, m- or p-nitrobenzenesulfonic acid, o-, m- or p-nitroaniline, 2-nitro-p-phenylenediamine, 2-amino-4-nitrophenol, 2-amino-5-nitrophenol and 4-amino-2-nitrophenol.

In order to carry out the self-condensation reaction of an aromatic amine compound alone, the condensation reaction of an aromatic amine compound with a phenol compound and the condensation reaction of an aromatic amine compound with an aromatic nitro compound, a mineral acid and a condensation catalyst are used. The mineral acids are exemplified by hydrochloric acid, nitric acid, hydrobromic acid, phosphoric acid and sulfuric acid.

Preferable condensation catalysts are exemplified by permanganic acid and salts thereof, such as permanganic acid and potassium permanganate; chromic acid-related compounds, such as chromium trioxide, potassium dichromate and sodium chlorochromate; metal nitrates, such as silver nitrate and lead nitrate; halogens, such as iodine and bromine; peroxides, such as hydrogen peroxide, sodium peroxide, benzoyl peroxide, potassium persulfate, ammonium persulfate, peracetic acid, cumene hydroperoxide, perbenzoic acid and p-menthane hydroperoxide; oxygen acids or oxygen acid salts, such as iodic acid, potassium iodate and sodium chlorate; metal salts, such as ferrous chloride, ferric chloride, copper sulfate, cuprous chloride, cupric chloride and lead acetate; ozone; and oxides, such as copper oxide, mercury oxide, cerium oxide, manganese dioxide and osmic acid. It is also effective to use hydrogen peroxide and ferrous chloride in combination.

The self-condensation reaction of an aromatic amine compound alone, the condensation reaction of an aromatic amine compound with a phenol compound and the condensation reaction of an aromatic amine compound with an aromatic nitro compound may be carried out in the presence of a condensation catalyst at 100 to 350° C. for 2 to 100 hours.

The ratio of an aromatic amine compound to a phenol compound or an aromatic nitro compound, which are used in the condensation reaction of an aromatic amine compound with a phenol compound and the condensation reaction of an aromatic amine compound with an aromatic nitro compound, depends on the types of the aromatic amine compounds, phenol compounds and aromatic nitro compounds and catalysts used, the reaction time, the reaction temperature and so forth. Generally, it is preferable to use from 0.1 to 10 mols of the phenol compound or the aromatic nitro compound per mol of the aromatic amine compound.

In order to make basic a condensation product of an aromatic amine compound with an aromatic nitro compound by the use of an alkali metal salt or an ammonium compound, for example, 100 parts by weight of the condensation product of an aromatic amine compound with an aromatic nitro compound is dispersed in water, 10 to 20 parts by weight of an alkaline or ammonium compound, such as NaOH, KOH, $Na_2CO_3$, $NH_4OH$ or $(NH_4)_2CO_3$ is added thereto, and the mixture obtained is heat treated at 90 to 140° C. The alkali or ammonium compound may be used in an amount sufficient to neutralize the mineral acid used at the time of the condensation reaction.

Quinone Compound Condensation Products

The quinone compound condensation products include, for example, (A) a self-condensation product of a quinone compound, and (B) a condensation product of a quinone compound with at least one compound selected from the group consisting of an aromatic hydroxyl compound and an aromatic amine compound. The use of such quinone compound condensation products or polyhydric naphthol self-condensation products in polymer scale preventive agents is disclosed in, for example, Japanese Pre-examination Patent Publication (kokai) Nos. 5-112603 and 6-56911.

The quinone compounds include, for example, benzoquinones and derivatives thereof, such as o-, m- or p-benzoquinone, tolu-p-quinone, o-xylo-p-quinone, thymoquinone, 2-methoxybenzoquinone, gentisyl quinone, polyporic acid and ubiquinone-n; naphthoquinones and derivatives thereof, such as 6-methyl-1,4-naphthoquinone, 2-methyl-1,4-naphthoquinone, α-naphthoquinone, juglone, lawsone, plumbagin, alkannin, echinochrome A, vitamin $k_1$, vitamin $k_2$, shikonin, β,β'-dimethyl acrylshikonin, β-hydroxyisovaleroshikonin and teracrylshikonin; anthraquinones and derivatives thereof, such as tectoquinone, 3-hydroxy-2-methylanthraquinone, anthraquinone, 2-hydroxyanthraquinone, alizarin, xanthopurpurin, rubiadin, munjistin, crysophanic acid, carminic acid, kermesic acid and laccaic acid A; and phenanthrenequinones such as phenanthrenequinone.

The aromatic amine compounds are specifically exemplified by aniline, o-, m- or p-chloroaniline, o-, m- or p-methylaniline, N,N-dimethyl-p-phenylenediamine, 4-chloro-o-phenylenediamine, 4-methoxy-o-phenylenediamine, 2-amino-4-chlorophenol, 2,3-diaminotoluene, 4-amino-2-aminophenol, o-, m- or p-aminophenol, o-, m- or p-aminobenzoic acid, 2,3-, 2,4-, 2,5-, 2,6-, 3,4-, 3,5- or 4,6-diaminobenzoic acid, 3- or 4-aminophthalic acid, 2-, 4- or 5-aminoisophthalic acid, 4,6-diaminoisophthalic acid, 2,5- or 2,6-diaminoterephthalic acid, 3-, 4- or 5-aminosalicylic acid, 4-hydroxyanthranilic acid, o-, m- or p-aminobenzenesulfonic acid, 2,3-, 2,4-, 2,5-, 2,6-, 3,4- or 3,5-diaminobenzenesulfonic acid, 2-amino-1-phenol-4-sulfonic acid and 6-amino-4-chloro-1-phenol-2-sulfonic acid, a-naphthylamine, β-naphthylamine, 1,5-diaminonaphthalene, 1-amino-5-hydroxynaphthalene, 1,8-diaminonaphthalene, 2,3-diminonaphthalene, 4-amino-1-naphthol, 1-amino-5-naphthol, 1,2-naphthylenediamine-7-carboxylic acid, 1,5-naphthylenediamine-2-carboxylic acid, 1,5-naphthylenediamine-4-carboxylic acid, 1,6-naphthylenediamine-4-carboxylic acid, 1,8-naphthylenediamine-4-carboxylic acid, 1,2-naphthylenediamine-3-sulfonic acid, 1,2-naphthylenediamine-4-sulfonic acid, 1,2-naphthylenediamine-5-sulfonic acid, 1,2-naphthylenediamine-6-sulfonic acid, 1,2-naphthylenediamine-7-sulfonic acid, 1,3-naphthylenediamine-5-sulfonic acid, 1,3-naphthylenediamine-6-sulfonic acid, 1,4-naphthylenediamine-2-sulfonic acid, 1,4-naphthylenediamine-7-sulfonic acid, 1,5-naphthylenediamine-2-sulfonic acid, 1,5-naphthylenediamine-4-sulfonic acid, 1,5-naphthylenediamine-7-sulfonic acid, 1,6-naphthylenediamine-2-sulfonic acid, 1,6-naphthylenediamine-4-sulfonic acid, 1,6-naphthylenediamine-7-sulfonic acid, 1,8-naphthylenediamine-4-sulfonic acid, 1,8-naphthylenediamine-3,6-disulfonic acid, 1,8-naphthylenediamine-4,5-disulfonic acid, α-amino-β-naphthalenepropionic acid, α-amino-β-naphthalenecarboxylic acid, 2-naphthylamine-1-sulfonic acid, 8-naphthylamine-1-sulfonic acid, 5-naphthylamine-1-sulfonic acid, 1-amino-2-naphthol-4-sulfonic acid, 2-amino-8-naphthol-6-sulfonic acid (γ-acid), 2-amino-5-naphthol-7-sulfonic acid (J-acid) and 1-amino-8-naphthol-3,6-disulfonic acid (H-acid), and diphenylamines, such as 4-aminodiphenylamine, 2-aminodiphenylamine, 4,4'-diaminodiphenylamine, 4-amino-3'-methoxydiphenylamine, 4-hydroxydiphenylamine, 4-amino-4'-hydroxydiphenylamine, 4-carboxydiphenylamine, 4-amino-4'-carboxydiphenylamine, 4-sulfodiphenylamine and 4-amino-4'-sulfodiphenylamine.

The aromatic hydroxyl compounds are exemplified by phenols and derivatives thereof, such as phenol, hydroquinone, resorcinol, catechol, hydroxyhydroquinone, pyrogallol, o-, m- or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid and 2,5-, 2,6- or 3,5-dihydroxytoluene.

In addition, they are exemplified by naphthols and derivatives thereof, such as α-naphthol, β-naphthol, 1,3-, 1,4-, 1,5-, 2,3-, 2,6- or 2,7-dihydroxynaphthalene, 1-hydroxy-2-naphthoic acid and 3-hydroxy-2-naphthoic acid.

The self-condensation of a quinone compound or the condensation of a quinone compound with an aromatic hydroxyl compound and/or an aromatic amine compound is carried out in an organic solvent medium, optionally in the presence of a condensation catalyst. The organic solvent medium has a pH within the range of from 1 to 13, preferably from 4 to 10, and pH adjusters may be used without any particular limitations. The pH adjusters used include acidic compounds, for example, phosphoric acid, sulfuric acid, phytic acid and acetic acid; and alkali compounds, for example, alkaline metal compounds or ammonium compounds, such as LiOH, KOH, NaOH, $Na_2CO_3$, $Na_2SiO_3$, $Na_2HPO_4$ and $NH_4OH$; and organic amine compounds, such as ethylenediamine, monoethanolamine and triethanolamine.

As the medium for the condensation reaction, organic solvents as exemplified by alcohols, ketones and esters, or mixed solvents of water and organic solvents miscible with water are preferred. Usable organic solvents miscible with water include, for example, alcohols, such as methanol, ethanol and propanol; ketones, such as acetone and methyl ethyl ketone; and esters, such as methyl acetate and ethyl acetate.

The condensation catalyst may be optionally used which is exemplified by azo catalysts such as α,α'-azobisisobutylonitrile and α,α'-azobis-2,4-dimethylvaleronitrile; elementary or molecular single halogens, such as iodine, bromine and chlorine; peroxides, such as hydrogen peroxide, sodium peroxide, benzoyl peroxide, potassium persulfate, ammonium persulfate, peracetic acid, cumene hydroperoxide, perbenzoic acid and p-menthane hydroperoxide; oxygen acids or oxygen acid salts, such as iodic acid, periodic acid, potassium periodate and sodium perchlorate. Incidentally, since the quinone compound acts as a condensation catalyst, the condensation reaction takes place even in the absence of a condensation catalyst.

The condensation reaction may be generally carried out at room temperature to 200° C. for 0.5 to 100 hours.

When (a) a quinone compound and (b) an aromatic hydroxyl compound and/or an aromatic amine compound are condensed, the proportion of both reactive components used depends on the types of the aromatic amine compounds, quinone compounds and aromatic hydroxyl compounds, the reaction temperature and the reaction time. It is preferable to use from 0.01 to 10.0 mols of the component (b) per mol of the component (a).

Sulfide Compounds of Aromatic Hydroxyl Compounds

Sulfide compounds of aromatic hydroxyl compounds refer to condensation products of aromatic hydroxyl compounds with sulfur chlorides such as sulfur monochloride and sulfur dichloride. Use of such sulfide compounds of aromatic hydroxyl compounds in the polymer scale preventive agent is disclosed in, e.g., Japanese Pre-examination Patent Publication (kokai) Nos. 4-311702, 4-339801, 5-155905 and 6-9711.

The aromatic hydroxyl compounds may include aromatic hydroxyl compounds of naphthol compounds described above, phenol compounds and the like.

To obtain the sulfide compounds, various methods are available. For example, a method is available in which the above phenols and sulfur chlorides such as sulfur monochloride and sulfur dichloride are subjected to condensation reaction. This reaction is carried out in an organic solvent inert to sulfur chlorides, in which a polyhydric phenol has been dissolved. Such an organic solvent may include, e.g., aromatic hydrocarbons such as toluene, xylene and chlorobenzene, and ethylene dichloride, chloroform and ethyl acetate. The phenol and the sulfur chloride may be in such a ratio that the latter is from about 0.5 to 2 mols, and preferably from about 0.9 to 1.2 mols, per mole of the former. The reaction may be carried out at a temperature of from about 50° C. to about 15° C. Hydrogen chloride formed as a by-product may be volatilized, or, in a closed system, a dehydrochlorinating agent such as triethylene-amine may be used. After the reaction has been completed, in an instance where the reaction product stand dissolved in the solvent, the solvent may be removed by evaporation to take out the reaction product. In an instance where the reaction product stand deposited, solid-liquid separating operation such as filtration may be carried out to take out the reaction product.

As another method for obtaining the sulfide compound, a method is available in which a polyhydric phenol and a small amount of an alkali hydroxide are heated and melted, sulfur powder is added thereto little by little and further the temperature is raised to about 150° C. to about 200° C., where the reaction is carried out while releasing to the outside of the system the hydrogen sulfide being formed, the reaction mixture is cooled and thereafter dissolved in the solvent described later, followed by filtration to collect the insoluble matter, which is then neutralized with a dilute acid, and the aqueous phase is removed to obtain the compound in the form of a solution.

Heterocyclic Compound having 5 or more Conjugated $\pi$ Bonds:

The heterocyclic compounds having 5 or more conjugated $\pi$ bonds include, for example, oxygen-containing heterocyclic compounds, nitrogen-containing heterocyclic compounds, sulfur-containing heterocyclic compounds, dicyclic compounds having a nitrogen atom possessed in common by the two rings, and alkaroids.

First, as the oxygen-containing heterocyclic compounds, there may be included:

benzofuran, isobenzofuran, dibenzofuran and derivatives thereof, such as furano-[2',3'-7,8]flavone, 9-phenylanthracene, o-oxymethyltriphenylcarbinol, 3,3'-diphenylphthalide, rubrene, α-sorinine and phenazone;

pyran derivatives and pyrone derivatives, such as 2-p-oxyphenyl-4,6-diphenylpyrylium ferrichloride, anhydrobase, benzopyran and 6-phenylcoumarin;

chromenol derivatives and chromene derivatives, such as 6-methyl-2,3-diphenylchromone, 6-methyl-2,3-diphenyl-4-(p-tolyl)-1,4-benzopyran-4-ol, chromanol, 7-chromene, oxychmarone, chromene, cyanizine chloride, fisetin, chrysinidine, apigenidin, rotoflavinidine, lutosonidine, galanginidine, fisenidine and molinidine;

flavone, flavonol and isoflavon derivatives, such as flavonol, flavone, fukugetin;

coumarin, its derivatives, isocoumarin and its derivatives, such as 7-oxy-3,4-benzocoumarin, dicoumarol, angelicin, psoralen, bergapten, bergaptol, xanthotoxin, xanthotoxal, isopimpinellin, pimpinellin, oroselol, oroselone, peucedanin, oxypeucedanin, ostruthol, medakenine, nodakenetin, seselin, xanthyletin, xanthoxyletin; and xanthone and related compounds; such as dixanthylene, 9-phenylxanthene, isoxanthone, 1,2,7,8-dibenzoxanthene, 3,9-diphenylxanthene, 9,9-diphenylxanthene, and the like.

Next, the nitrogen-containing heterocyclic compounds may include:

indoles, such as indolo[3,2-c]quinoline, indolo[1,2-c]quinazoline, 2-(1-naphthyl)-3-triphenylmethylindole, 2-(2-naphthyl)-3-triphenylmethylindole, 3,3'-diindolyl and 3,2'-diindolyl;

oxoderivatives of indole, such as 3-(4-ethoxy-1-naphthyl)oxyindole and indophenine;

carbazoles, such as 1-phenyl-1,2,3-benzotriazole, 2,2'-diaminodiphenyl, 1,1'-dicarbazole;

porphyrins, such as porphyrazine, magnesium octamethyltetraazaporphyrin, azadipyromethine, diazacoproporphyrin, porphine and mesotetraphenylporphyrin;

oxazoles, such as phenanthrooxazole;

thiazoles, such as α-naphthothiazole, β-naphthothiazole, naphtho[1,2]thiazole, 2-methyl[1,2]thiazole, 2-phenylnaphtho[1,2]thiazole, 2-methylnaphtho[2,1]-thiazole, 2-oxynaphtho[2,1]thiazole, 2-aminonaphtho[1,2]thiazole and 2-mercaptonaphtho[1,2]-thiazole;

oxadiazoles, such as naphtho[1,2]furazane;

quinoline and related compounds, such as quinoline, quinaldine, quinaldine-N-oxide, ethylquinoline, 2-phenylquinoline, 3-methylquinoline, 4-phenylquinoline, 6-methylquinoline and 2,4-dimethylquinoline;

isoquinoline and related compounds. such as 1-methylisoquinoline, 1-phenylisoquinoline, 4-phenylisoquinoline, 1,1'-biisoquinoline and 5,5'-biisoquinoline;

acridine and related compounds, such as acridine, 1-methylacridine, 9-phenylacridine, 9-(3-pyridinyl)acridine, 2-acridinol, acridine-3,6-diol, 4-methoxyacridine, 9-phenoxyacridine, 1-nitroacridine, 4-aminoacridine, 1-aminoacridine, 9-phenylaminoacridine, 9-oxyacridine and 3,6-diamino-4,5-dimethylacridine;

phenanthridines, such as 3,4-benzoquinoline, 6-methylphenanthridine, 6-aminomethylphenanthridine and 6-phenylphenanthridine;

anthrazolines, such as pyrido[2,3-g]quinoline, 2,7-diphenyl[2,3-g]quinoline, 2,8-diphenylpyrido[3,2-g]-quinoline;

phenanthroline and related compounds, such as 1,7-phenanthroline and 1,10-phenanthroline;

pyridoindoles, such as 1,9-pyridoindole, 2,9-pyridoindole and 4,9-pyridoindole;

naphthylidine and related compounds, such as 1,5-naphthylidine, 1,7-naphthylidine, 1,8-naphthylidine, 3-amino-1,5-naphthylidine, 2-amino-1,5-naphthylidine and 2-oxy-1,7-naphthylidine;

oxazine and related compounds such as phenoxazinone and resazurin;

thiazine and related compounds, such as phenothiazine, nitrophenothiazine, 4-amino-4'-anilinodiphenyl disulfide, 2-chloro-10-(3-dimethylaminopropyl)phenothiazine, 10-[1-methyl-3-piperidylmethyl)phenothiazine and 2-acetyl-10-(3-dimethylaminopropyl)phenothiazine;

pyridazine and related compounds, such as cinnoline, 3-methylcinnoline, 4-chlorocinnoline, 3-bromocinnoline, 4-cinnolinol, 4-aminocinnoline, phthalazine, 4-ethyl-2-phenylphthalazinone and phthalazine thiol;

pyrimidine and related compounds, such as sulfadiazine, sulfisomidine, pteridine, 2,4-pterine diol, 2-amino-6-methyl-4-pteridinol, xanthopterine, quinazoline, 2,4-dichloroquinazoline and 2,3-diphenyl-4-quinazoline;

pyrazine related compounds, such as quinoxaline and 2-methylquinoxaline;

tri- and tetra-hetero six-membered cyclic compounds, such as 1,2,4-benzotriazine and 1,2,4-benzotriazine-3-ol;

Further, the sulfur-containing heterocyclic compounds may include:

fused thiophene compounds, such as dihydronaphtho[2,1-b]-thianaphthene, 1,3-diphenylisothianaphthene and dibenzothiophene;

five-membered monocyclic compounds containing 2 hetero atoms, such as 3,4-dihydronaphtho-2,1-trithione, thiaflavone, thiacoumarin, thiaxanthene, thiaxanthohydrol, thiaxanthone, Milacil D, and bisthiaxanthylene;

six-membered cyclic compound having two or more hetero atoms, such as thianthrene, 2,7-dimethylthianthrene, 1-thianthrenyl lithium, 1-chlorothianthrene and phenoxathine.

Further, other useful compounds may include:

dicyclic compounds having a nitrogen atom possessed in common by the two rings, such as 2:3-benzopyrrocoline, 1,5,8-trimethyl-2:3-benzopyrrocoline and 1-ethyl-5,8-dimethyl-2:3-benzopyrrocoline; and alkaroids, such as casimiroin, 2-penthylquinoline, 4-oxy-2-pentylquinoline and 4-methoxy-2-pentylquinoline.

Of the conjugated π bond compounds, it is preferable to use those which are condensation products of aromatic compounds and have a weight-average molecular weight of 500 or more.

Of the condensation products of aromatic compounds, aldehyde compound/aromatic hydroxyl compound condensation products and quinone compound condensation products are particularly preferred.

The first layer having been formed, may preferably have a surface having a contact angle to water of 60° or more, and more preferably from 70 to 130°, and still more preferably from 80 to 130° after the surface has been brought into contact with a solution of mixture of water and a vinyl chloride monomer in a weight ratio of 1:1, at 50° C. for 1 hour. Accordingly, it is preferable to use a first coating liquid that can form such a first layer. Selection of a conjugated π bond compound capable of forming a first layer having a contact angle to water of 60° or more, can be readily performed by way of a simple test.

Making this layer have a contact angle to water of 60° or above can be effective for forming a first layer having a high adhesion to inner wall surfaces, which are constituted of a metal such as stainless steel, or glass, of the polymerization vessel and having a durability. If this contact angle is too small, the first layer may have so weak an adhesion to the inner wall surfaces and others that the resultant coating film tends to be washed off with the water formed upon condensation of the steam. Thus, any uniform first layer with a good adhesion cannot be formed.

The first coating liquid for formation of the first layer is prepared by dissolving the conjugated π bond compound in a proper solvent. The solvent includes, for example, water; alcohol solvents, such asmethanol, ethanol, propanol, butanol, 2-butanol, 2-methyl-1-propanol, 2-methyl-2-propanol, 3-methyl-1-butanol, 2-methyl-2-butanol and 2-pentanol; ketone solvents, such as acetone, methyl ethyl ketone and methyl isobutyl ketone; ester solvents, such as methyl formate, ethyl formate, methyl acetate, ethyl acetate and ethyl acetoacetate; ether solvents, such as 4-methyldioxolane and ethylene glycol diethyl ether; furans; and non-protonic solvents, such as dimethylformamide, dimethyl sulfoxide and acetonitrile. The solvents may be appropriately used singly or as a mixed solvent of two or more thereof.

Among the above solvents, preferred are water and a mixed solvent of water and an organic solvent miscible with water. Among the above organic solvents, organic solvents miscible with water include alcohol solvents, such as methanol, ethanol and propanol; ketone solvents, such as acetone and methyl ethyl ketone; and ester solvents, such as methyl acetate and ethyl acetate. Particularly, it is preferred that alcohol solvents are used. In the case where a mixed solvent of water and an organic solvent miscible with water is used, the organic solvent is preferably contained in such an amount that there is no danger of inflammation, evaporation and the like and there is no problem on safety in handling, for example, on toxicity. Specifically, the amount is preferably 50% by weight or less, more preferably 30% by weight or less.

The pH of the first coating liquid is selected appropriately depending on the kind of the conjugated π bond compound. For example, for pyrogallolacetone condensation products, polyhydric phenol self-condensation products and polyhydric naphthol self-condensation products, a pH of 2.0 to 6.5 is preferred. For this pH adjusters used for adjustment of the pH include, for example, hydrochloric acid, sufuric acid, phosphoric acid, pyrophosphoric acid and nitric acid. For the condensation products of aldehyde compound/aromatic hydroxyl compound, condensation products of an aromatic amine compound, and condensation products of a quinone compound, a pH of 7.5 to 13.5 is preferred, and a pH of 8.0 to 12.5 is more preferred. For that case, alkaline compounds used for pH adjustment include, for example, alkali metal compounds or ammonium compounds, such as LiOH, NaOH, KOH, $Na_2CO_3$, $Na_2HPO_4$ and $NH_4OH$; and organic amine compounds, such as ethylenediamine, monoethanolamine, diethanolamine and triethanolamine.

The conjugated π bond compound in the first coating liquid may preferably be in a concentration ranging from 1.0 to 25.0% by weight, more preferably from 2.5 to 15.0% by weight, and still more preferably from 4 to 10% by weight. If they are in too a low concentration, a difficulty may occur such that the steam must be used in a large quantity in order to form the first layer in an effective quantity. If they are in too a high concentration, the coating liquid may become unstable to cause a precipitate during storage in a storage tank, or the first layer obtained by coating on the inner wall surfaces and others may have an uneven coating thickness to cause a decease in the scale prevention effect. Preferably, all of the solutes are completely dissolved in a solvent to form the first coating liquid in a uniform solution.

The first coating liquid may optionally contain a water-soluble polymeric compound, an inorganic colloid, etc. to such an extent that the performance of forming uniform coating films and the adhesion of the first layer to the inner wall surface, are not impaired, in addition to the conjugated π bond compound.

[Coating-Film Second Layer]

The second layer is formed on the first layer thus formed. This second layer has a surface having a contact angle to water of less than 60°, and preferably from 10 to 55° C., after its surface has been brought into contact with a solution of mixture of water and a vinyl chloride monomer in a weight ratio of 1:1, at 50° C. for 1 hour. When this contact angle to water is less than 60°, the second layer exhibits a good effect of adhesion to the first layer. Simultaneously, monomers and polymers contained in the polymerization reaction mixture can be prevented from adhering to the polymerization vessel inner wall surfaces and others during polymerization, making it possible to attain the scale prevention effect. If on the other hand the contact angle to water is 60° or more, the monomers and polymers tends to be absorbed on the coating film, making it impossible to attain a sufficient scale prevention effect.

As a second coating liquid used to form such a second layer having a contact angle to water of less than 600, it is preferable to use a coating liquid containing at least one hydrophilic compound selected from the group consisting of a water-soluble polymeric compound, an inorganic colloid, an inorganic salt and an acid.

Water-soluble Polymeric Compound

The water-soluble polymeric compound includes, for example, water-soluble hydroxyl group-containing polymeric compounds, water-soluble amphoteric polymeric compounds, water-soluble anionic polymeric compounds and water-soluble cationic polymeric compounds.

The water-soluble hydroxyl group-containing polymeric compounds include, for example, starches such as amylose, amylopectin, dextrin and oxidized starch; animal viscous liquid materials such as chitin; cellulose derivatives such as methyl cellulose, glycol cellulose, methyl ethyl cellulose, hydroxyethyl cellulose, and hydroxyethyl methyl cellulose; hemicelluloses such as xylan, mannan, arabogalactan, galactan, and araban; lignins such as alcohol lignin, dioxane lignin, phenol lignin, hydrotropic lignin, mercaptolignine, alkali lignin, thioalkali lignin, acid lignin, cuproxam lignin, and periodate lignin; and partially saponified polyvinyl alcohols and polyvinyl alcohols. Among these, preferred are amylopectin, dextrin, methyl cellulose, glycol cellulose, mannan, galactan, alcohol lignin, dioxanelignin, alkali lignin, and acid lignin. The water-soluble amphoteric polymeric compounds include, forexample, glue, gelatin, casein, albumin, ribonucleic acids, deoxyribonucleic acids, and chitosan. The water-soluble anionic polymeric compounds include, for example, anionic polymeric compounds having a carboxyl group or sulfonic acid group in their side chain as exemplified by sulfomethylated compounds of polacrylamide, polyacrylic acid, alginic acid, an acrylamide/vinylsulfonic acid copolymer, polymethacrylic acid and poystyrenesulfonic acid, carboxymethyl starch, pectic acid, pectinic acid, protopectinic acid, carragheenin, hyaluronic acid, chondroitin sulfuric acid, heparin, keratosulfuric acid, thioglycollic acid, lignin sulfonic acid, styrene-maleic anhydride copolymers, acrylic acid-maleic anhydride copolymers, and carboxymethyl cellulose. The water-soluble cationic polymeric compounds include cationic polymeric electrolytes having nitrogen atoms on the side chains, the nitrogen atoms having positive charges, as exemplified by polyethylene-imine, polyvinyl amine, polyacrylamide, an N-vinyl-2-pyrrolidone/acrylamide copolymer, a cyclized polymer of dimethyldiamyammonium chloride, a cyclized polymer of dimethyldiethylammonium bromide, a cyclized polymer of diallylamine hydrochloride, a cyclized copolymer of dimethyldiallylammonium chloride with sulfur dioxide, polyvinyl pyridine, polyvinyl pyrrolidone, polyvinyl carbazole, polyvinyl imidazoline, polydimethylaminoethyl acrylate, polydiethylaminoethyl acrylate, polydiethylaminoethyl methacrylate, and derivatives or modified products of any of these polymeric compounds, as exemplified by partially cross-linked products, copolymers, graft copolymers, and these polymeric compounds into which a functional group such as —OH, —NH$_2$, —COOH or —SO$_3$H has been introduced.

Of the water-soluble polymeric compounds exemplified above, preferred are methyl cellulose, hydroxyethyl cellulose, hydroxyethyl methyl cellulose, polyvinyl alcohol, partially saponifiedpolyvinyl alcohol, glue, casein, gelatin, chitosan, polyacrylic acid, alginic acid, polymethacrylic acid, pectic acid, carragheenin, hyaluroic acid, carboxymethyl cellulose, polyvinyl pyrrolidone and a styrene-maleic anhydride copolymer.

Inorganic Colloid

The inorganic colloids include, for example, colloids of oxides or hydroxides of metals selected from aluminum, thorium, titanium, zirconium, antimony, tin, iron and so forth; colloids of tungstic acid, vanadiumpentoxide, selenium, sulfur, silica, gold or silver; and silver iodide sol. Among them, preferred are colloids of oxides or hydroxides of metals selected from aluminum, titanium, zirconium, tin and iron; and colloidal silica. These inorganic colloids may be those obtained by any production processes on which there are no particulate limitations. For example, particulate colloids produced by a dispersion process using water as a dispersion medium or an agglomeration process are available. The colloidal particles ave a size of preferably 1 to 500 m$\mu$.

Inorganic Salt

The inorganic salts include, for example, alkaline metal silicates and inorganic salts of alkaline-earth metals.

The alkaline metal silicate include, for example, metasilicates (M$_2$SiO$_3$), orthosilicates (M$_4$SiO$_4$), disilicates (M$_2$Si$_2$O$_3$), trisilicates (M$_3$Si$_3$O$_7$) and sesquisilicates (M$_4$Si$_3$O$_{10}$) wherein in these formulae, M represents an alkaline metal, such as lithium, sodium or potassium, of alkaline metals; and water glass.

The inorganic salts of alkaline earth metals include, e.g., silicates, carbonates, phosphates, sulfates, nitrates, borates, acetates, hydroxides, oxides or halides of alkaline earth metals such as magnesium, calcium and barium. Of these alkaline earth metal compounds, particularly preferred are magnesium carbonate, calcium carbonate, magnesium phosphate, calcium phosphate, calcium pyrophosphate, calcium dihydrogenpyrophosphate, barium phosphate, calcium sulfate, calcium borate, magnesium hydroxide, calcium hydroxide, barium hydroxide, magnesium chloride and calcium chloride.

Acid

The acid may include inorganic acids such as phosphoric acid, pyrophosphoric acid, polyphosphoric acid, phosphomolybdenic acid, silicomolybdenic acid, phosphotungstic acid, silicotungstic acid, molybdic acid and tungstic acid; and organic acids such as terephthalic acid, 1,12-dodecanedicarboxylic acid, 1-dodecanedisulfonic acid, benzoic acid, lauric acid, sulfanilic acid, p-styrene sulfonic acid, propionic acid, salicylic acid, copper phthalocyanine tetrasulfonic acid, urocanic acid, L-asciorbic acid, D-isoasciorbic acid, chlorogenic acid, caffeic acid, p-toluenesulfonic acid, sorbic acid, β-naphthoquinone 4-sulfonic acid, phytic acid and tannic acid.

Of the above hydrophilic compounds, water-soluble polymeric compounds, inorganic colloids and inorganic salts are preferred, and water-soluble polymeric compounds are particularly preferred.

The second coating liquid for the second layer is prepared by dissolving at least one selected from the above hydrophilic compounds in a suitable solvent. As the solvent, water or a mixed solvent of water and a hydrophilic organic solvent having an affinity for water may be used. Of the above solvents, the hydrophilic organic solvent may include alcohol type solvents such as methanol, ethanol and propanol; ketone type solvents such as acetone and methyl ethyl ketone; and ester type solvents such as methyl acetate and ethyl acetate. In addition, of the above solvents, it is preferable to use alcohol type solvents. In the case when the mixed solvent of water and the hydrophilic organic solvent is used, the hydrophilic organic solvent may preferably be used in such a content that there is no danger of combustion or explosion and there is no problem on the safety in handling such as toxicity. Stated specifically, the hydrophilic organic solvent may preferably be in a content of 50% by weight or less, and more preferably 30% by weight or less. Preferably, all of the solutes are completely dissolved and colloidal particles are completely uniformly dispersed in a solvent to form the second coating liquid in a uniform solution.

A pH adjuster such as NaOH or ethylenediamine may also optionally be used.

The hydrophilic compound in the second coating liquid may preferably be in a concentration ranging from 0.01 to 20% by weight, more preferably from 0.1 to 15% by weight.

[Carrier Steam]

According to the process of the present invention, both the first layer and the second layer are formed by coating the respective coating liquids by means of steam as a carrier. The steam used may be steam usually available or superheated steam, and may preferably be steam having a pressure of from 2 to 35 kgf/cm$^2$ G, and more preferably one having a pressure of from 2.8 to 20 kgf/cm$^2$ G.

The steam may preferably have a temperature of from 120 to 260° C., and more preferably form 130 to 200° C.

The pressure and temperature of the steam described above are the values measured before mixing of the steam with a coating liquid, for example, at the inside of the steam feed line 6 as shown in FIG. 1 described below.

[Formation of Coating Film]

The coating film comprising the first layer and the second layer will be described with reference to FIG. 1, which illustrates the arrangement in a polymerization apparatus.

Step 1. (Pre-heating of polymerization vessel inner wall surfaces and others by steam)

Hot water or the like is passed through a jacket 2 attached to a polymerization vessel 1 to pre-heat the polymerization vessel inner wall surfaces to a temperature of 50° C. or above (preferably from 50 to 95° C.). At the upper part of this polymerization vessel, a coating ring 4 is provided which is formed of a ring-shaped pipe and has upward nozzles 3b and downward nozzles 3a. To the coating ring 4, a line 5 is connected through which the steam and the coating liquid are fed from the outside of the polymerization vessel 1. To line are connected a steam feed line 6, the first coating liquid feed line 7 and the second coating liquid feed line 8 through the respective valves. If necessary, the steam (usual steam or superheated steam) may be blown into the vessel from the coating nozzles 3a and 3b of this coating ring 4 to pre-heat also baffles (not shown) and stirring blades (not shown). In this apparatus, the steam is fed to the coating ring 4 from a steam feeder 9 via a flowmeter 10 through lines 6 and 5.

Step 2. (First-stage coating)

The steam is fed to the coating ring 4, and the first coating liquid held in a first coating liquid tank 11 is fed to the coating ring 4 through lines 7 and 5 by means of a pump 12 or an aspirator valve (not shown). P denotes a pressure gauge. The first coating liquid is carried by the steam and is, in the state of mist, applied to and coated on polymerization vessel inner wall surfaces and surfaces with which polymers come into contact during polymerization, such as baffle surfaces and stirring blade surfaces. Simultaneously with this coating, the first coating liquid coated on these surfaces is dried (simultaneous drying), so that the first layer is formed. Hence, it is unnecessary to make any particular operation for the drying.

The steam (G) and the coating liquid (L) may preferably be in a mixing ratio (L/G) of from 0.01 to 1.0, and more preferably from 0.03 to 0.2, as flow rate ratio on the basis of weight.

Step 3. (Second-stage coating)

Subsequently, in the state the steam is kept flowing, the second coating liquid held in a second coating liquid tank 13 is fed to the coating ring 4 similarly through lines 8 and 5 by means of a pump 14, and is coated to form the second layer (not shown). Like the instance of the first-stage coating, the second coating liquid coated on the first layer is dried simultaneously with the coating (simultaneous drying), so that the second layer is formed, thus it is unnecessary to make any particular drying operation.

Also in this second-stage coating, the steam(G) and the coating liquid (L) may preferably be in a mixing ratio(L/G) of 0.01 to 1.0, more preferably 0.03 to 0.2, in terms of flow rate ratio on the basis of weight.

Step 4. (Water washing)

After the steam and the coating liquid are stopped being fed, the inside of the polymerization vessel is washed with cleaning water held in a water tank 15. The cleaning water is fed into the polymerization vessel 1 from nozzles 18 through a line 17 by means of a pump 16. However, water washing is unnecessary if the coating liquid does not so affect the product quality.

The first layer thus formed may preferably have a dried coating weight of from 0.0005 to 3 g/m$^2$, and more preferably from 0.0005 to 1 g/m$^2$. The second layer may preferably have a dried coating weight of from 0.0005 to 2 g/m$^2$, and more preferably from 0.0005 to 1 g/m$^2$. The first layer and second layer may preferably have a total dried coating weight of from 0.001 to 5 g/m$^2$, and more preferably from 0.001 to 2 g/m$^2$.

Polymerization

The process of the present invention is applied to the polymerization of a monomer having an ethylenically unsaturated double bond. Examples of the monomer include vinyl halides such as vinyl chloride; vinyl esters such as vinyl acetate and vinyl propionate; acrylic acid, methacrylic acid and their esters or salts; maleic acid, fumaric acid and their esters or anhydrides; diene monomers such as butadiene, chloroprene and isoprene; styrene; acrylonitrile; vinylidene halides; and vinyl ether. Examples particularly suitable for practicing the process of the present invention include the production of polymers of vinyl halides, such as vinyl chloride, vinylidene halides, or a monomeric mixture comprised primarily of them by suspension polymerization or emulsion polymerization in an aqueous medium. The coating film formed by the process of the present invention has a high durability even for monomers, such as α-methylstyrene, acrylic acid esters, acrylonitrile and vinyl acetate, which have a high solvency power for the conventional coating film, so that the process can be carried out suitably even for the production of polymer beads and latex comprised of polystyrene, polymethacrylate, polyacrylonitrile, etc.; the production of synthetic rubbers such as SBR, NBR, CR, IR, IIR, etc.(these synthetic rubbers are generally produced by emulsion polymerization); and the production of ABS resin.

In the polymerization of one or more of these monomers, an object of preventing scale can be effectively accomplished irrespective of polymerization types, such as suspension polymerization, emulsion polymerization, bulk polymerization and solution polymerization, even in the presence of any of additives such as emulsifiers, stabilizers, lubricants, plasticizers, pH adjusters and chain transfer agents. For example, in the case of suspension polymerization or emulsion polymerization of a vinyl monomer, various additives are optionally added, as required. The additives include, for example, suspending agents such as partially saponified polyvinyl alcohol and methyl cellulose; anionic emulsifiers such as sodium lauryl sulfate; nonionic emulsifiers such as sorbitan monolaurate and polyoxyethylene alkyl ether; stabilizers such as tribasic lead sulfate, calcium stearate, dibutyltin dilaurate and dioctyltin mercaptide; chain transfer agents such as trichloroethylene and mercaptans; and pH adjusters. According to the present process, deposition of scale is effectively prevented in the presence of any of the additives above.

The remarkable polymer scale deposition preventive effect of the invention is exhibited without being affected by the kind of polymerization catalysts even when any of catalysts is used. Specifically, the catalysts include, for example, t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivarate, bis(2-ethoxyethyl)peroxydicarbonate, benzoyl peroxide, diisopropylbenzene hydroperoxide, lauroyl peroxide, 2,4-dichlorobenzoyl peroxide, diisopropyl peroxydicarbonate, α,α'-azobisisobutylonitrile, α,α'-azobis-2,4-dimethylvaleronitrile, di-2-ethylhexyl diperoxyisophthalate, potassium persulfate and ammonium persulfate.

Other conditions for polymerization may be those which are conventionally used, and there are no limitations unless the effects of the present invention are impaired.

In the following, taking the cases of suspension polymerization, solution polymerization and bulk polymerization as examples, typical conditions of polymerization will be described.

First, in the suspension polymerization, water and a dispersant are charged into a polymerization vessel. Subsequently, the polymerization vessel is evacuated to reduce the initial pressure to a value of 0.1 to 760 mmHg (0.01 to 101 kPa), and a monomer or monomers are then charged, whereupon the internal pressure takes usually a value of 0.5 to 30 kgf/cm$^2$·G (150 to 3,040 kPa). Thereafter, polymerization is carried out at a reaction temperature of 30 to 150° C. During the polymerization, one or more materials selected from water, a dispersant and a polymerization initiator are, optionally, added. Reaction temperature during the polymerization is different depending on the kind of a monomer to be polymerized. For example, in the case of polymerizing vinyl chloride, polymerization is carried out at 30 to 80° C., while in the case of polymerizing styrene, polymerization is carried out at 50 to 150° C. The polymerization may be judged to be completed when the pressure inside the polymerization vessel has dropped to a value of 0 to 7 kgf/cm$^2$·G (100 to 790 kPa) or when there has been observed substantially no difference between the inlet temperature and outlet temperature of a cooling water flowing into and out of a jacket provided circumferentially of the polymerization vessel (i.e., when liberation of heat due to the polymerization reaction has subsided). The amounts of the water, dispersant and polymerization initiator are generally to 500 parts by weight, 0.01 to 30 parts by weight, and 0.01 to 5 parts by weight, respectively, per 100 parts by weight of the monomer.

In solution polymerization, an organic solvent, such as toluene, xylene and pyridine, is used as the polymerization medium, in place of water. If necessary, a dispersant may be used. The other conditions for polymerization are generally the same as those described for suspension polymerization.

In bulk polymerization, after a polymerization vessel is evacuated to a pressure of about 0.01 to 760 mmHg (0.001 to 101 kPa), a monomer and a polymerization initiator are charged into the polymerization vessel, and then polymerization is carried out at a reaction temperature of −10 to 250° C. For example, the reaction temperature is 30 to 80° C. for the polymerization of vinyl chloride, and is 50 to 150° C. for the polymerization of styrene.

EXAMPLES

The present invention will now be described below in greater detail by giving Examples. In the following, "part (s)" refers to "part(s) by weight". In tables, "auxiliary agent" refers to "polymer scale preventive auxiliary agent".

Production of Condensation Products

In the following Production Examples, the weight-average molecular weight of each condensation product obtained was measured in the following way.

Measurement of Weight-average Molecular Weight

Weight-average molecular weight in terms of polystyrene was measured by gel permeation chromatography (GPC) under the following measurement conditions.

Columns:
Guard column:
Tradename: slim-pack GPC-800DP, manufactured by Shimadzu Corporation.
Analytical columns:
Tradename: slim-pack GPC-803D, 802D, manufactured by Shimadzu Corporation.
Mobile phase: 10 mM LiBr/DMF
Flow rate: 1.0 ml/min
Detector: RI
Temperature: 60° C.

Production Example 1

Production of Condensation Product No. 1

Into a pressure-resistant reaction vessel, 30,000 mols (960 kg) of methanol, 100 mols (15.8 kg) of 1,8-diaminonaphthalene, 50 mols (5.4 kg) of p-benzoquinone and 250 mols (31.5 kg) of pyrogallol were charged, and the temperature was raised to 70° C. with stirring. After the reaction was carried out at 70° C. for 10 hours, the reaction mixture was cooled to obtain a methanol solution of a condensation product (Condensation Product No. 1). The Condensation Product No. 1 had a weight-average molecular weight of 3,500.

Production Example 2

Production of Condensation Product No. 2:

With reference to Production Example 3 disclosed in Japanese Patent Publication (kokoku) No. 6-62709, a scale deposition preventive agent was produced.

Into a pressure-resistant reaction vessel, 30 mols (5.59 kg) of 2,2'-dihydroxybiphenyl, 30 mols (0.948 kg) of paraformaldehyde with a purity of 95%, 0.19 kg of paratoluenesulfonic acid and 10 liters of ethylene glycol dimethyl ether were charged, and the temperature was raised to 130° C.

with stirring. After the reaction was carried out at 130° C. for 17 hours, the reaction mixture was cooled to 50° C. and then put into 50 liters of water. The resin separated by putting said mixture into water was filtered off and then washed with water, followed by drying to obtain 5.1 kg of a 2,2'-dihydroxybiphenyl-formaldehyde condensation resin (Condensation Product No. 2). The Condensation Product No. 2 had a weight-average molecular weight of 5,400.

Production Example 3
Production of Condensation Product No. 3:
With reference to Production Example 1 disclosed in Japanese Pre-examination Patent Publication (kokai) No. 57-164107, a polymer scale deposition preventive agent was produced.

Into apressure-resistant reaction vessel, 250 mols (36.0 kg) of 1-naphthol and 180 liters of 1N-NaOH aqueous solution (containing 180 mols or 7.2 kg of NaOH) were charged, and the temperature was raised to 70° C. with stirring. Next, to the reaction mixture, formaldehyde (19.75 liters of 38 w/v % aqueous solution, 250 mols) was dropwise added over a period of 1.5 hours. During the addition, the internal temperature of the reaction vessel was controlled so as not to exceed 80° C. Then, the reaction mixture was cooled to 60° C. over a period of 3 hours with the stirring kept. Next, the temperature of the reaction mixture was raised to 98° C. to carry out the reaction at 98° C. for 1.5 hours. Thereafter, the reaction mixture was cooled to obtain an alkaline solution of a condensation product (Condensation Product No. 3). The Condensation Product No. 3 had a weight-average molecular weight of 2,400.

Production Example 4
Production of Condensation Product No. 4:
With reference to Coating Compound Synthesis 2 disclosed in Japanese Pre-examination Patent Publication (kokai) No. 57-192413, a scale deposition preventive agent was produced.

Into apressure-resistant reaction vessel, 100 mols (12.6 kg) of pyrogallol and 100 liters of water were charged, and the pyrogallol was dissolved in the water. Next, to the solution obtained, 200 mols (21.2 kg) of benzaldehyde and 300 mols (29.4 kg) of phosphoric acid were added, and the mixture thereof was reacted at 95° C. for 10 hours. As a result, a water-insoluble reddish brown product was obtained. This water-insoluble product was washed with ether, followed by extraction with methanol to extract a methanol-soluble matter from the water-insoluble product. Then, the methanol was removed from the extract by drying to obtain Condensation Product No. 4 (pyrogallol-benzaldehyde condensate), as a residue, which had a weight-average molecular weight of 4,500.

Production Example 5
Production of Condensation Product No. 5:
With reference to Production Example I disclosed in Japanese Patent Publication (kokoku) No. 59-16561, a scale deposition preventive agent was produced.

Into apressure-resistant reaction vessel, 100 mols (10.8 kg) of m-phenylenediamine, 200 mols (22.0 kg) of resorcinol and 1.04 kg of 35% hydrochloric acid (10 mols as HCl) as a catalyst were charged, and the temperature was raised to 305° C. Immediately after the mixture in the reaction vessel reached 305° C., it was cooled. The water vapor evolved in the course of the raise in temperature and the reaction was removed, and the internal pressure was kept at 150 kPa or below. After cooling, the resulting m-phenylenediamine/resorcinol condensate was pulverized, followed by washing with water, filtering and drying, to obtain Condensation Product No. 5 which had a weight-average molecular weight of 4,000.

Production Example 6
Production of Condensation Product No. 6:
With reference to Production Example VI disclosed in Japanese Patent Publication (kokoku) No. 59-16561, a scale deposition preventive agent was produced.

Into apressure-resistant reaction vessel, 100 mols (10.9 kg) of p-aminophenol and 0.99 kg of 30% hydrochloric acid (9.5 mols as HCl) were charged, and the temperature was raised to 169° C. Immediately after the reaction mixture reached 169° C., 18 liters of xylene was slowly added. The xylene was added so that the water formed during the condensation reaction was removed as an azeotropic mixture. Next, the temperature of the reaction mixture was raised to 222° C., and the reaction was carried out at 222° C. for 3 hours. The xylene-water mixed vapor evolved during the reaction was removed, and the internal pressure was kept at 150 kPa or below. After the reaction was carried out for 3 hours, the reaction mixture was cooled. The reaction product (Condensation Product No. 6) obtained was solid. Next, the reaction product was pulverized into fine particles, and thereafter washed with water, followed by filtration and then drying to obtain the Condensation Product No. 6 which had a weight-average molecular weight of 2,500.

Production Example 7
Production of Condensation Product No. 7:
With reference to Production Example 1 disclosed in Japanese Pre-examination Patent Publication (kokai) No. 54-7487, a scale deposition preventive agent was produced.

Into a reaction vessel, 200 mols (22.0 kg of resorcinol was charged, and then heated in a nitrogen atmosphere. The temperature of resorcinol was raised to 300° C., and the reaction was carried out at 300° C. for 8 hours, followed by cooling. The solid self-condensed resorcinol thus obtained was pulverized to obtain Condensation Product No. 7 which had a weight-average molecular weight of 1,700.

Production Example 8
Production of Condensation Product No. 8:
(1) Synthesis of a 2,3-dihidoroxynaphthalene dimer compound:
Into a flask having an inner capacity of 3 liters provided with a reflux condenser, 1350 mL of methanol was charged and then 144 g (0.9 mol) of 2,3-dihydoroxynaphthalene was dissolved therein. After the dissolution, the temperature was raised to 65° C., and 243 g (0.9 mol) of ferric chloride hydrate($FeCl_3 6H_2O$) dissolved in 450 mL of methanol was added dropwise to the solution obtained under reflux over 30 minutes. After the addition, reaction was continued under reflux for 5 hours. Subsequently, the reaction solution was transferred into 4.5 liters of a diluted hydrochloric acid and then the resulting mixture was stirred for 12 hours, to produce a dimer compound of 2,3-dihydroxynaphthalene. The reaction solution thus obtained was filtered to remove the solvents, and thereafter the residual matter was washed with two liters of pure water for two hours. The solution was filtered again to remove the ferric chloride hydrate ($FeCl_3 6H_2O$).

The dimer compound of 2,3-dihydroxynaphthalene obtained was dried in a dryer at 40° C.
(2) Into a 3 liter-flask provided with a reflux condenser, one liter of pure water was charged, and then 5 g of sodium hydroxide and 50 g of the 2,3-dihydroxynaphthalene dimer compound obtained as above were charged. Subsequently, after the temperature was raised to 70° C., 12.75 g of 37% aqueous formaldehyde solution dissolved in 237.3 g of distilled water, was added dropwise over 30 minutes. After the addition, reaction was continued at the same temperature for five hours, and then the temperature was raised to 95° C. and reaction was continued for further two hours, thereby Condensation Product No. 8 being obtained. Incidentally, the reactions were all carried out in $N_2$ atmospheres.

After the completion of the reactions, Condensation Product No. 8 was cooled to 25° C., and then preserved in an $N_2$ atmosphere. The weight-average molecular weight was 22,000.

Production Example 9
Production of Condensation Product No. 9:

Into a reaction vessel having an inner capacity of 2 liters provided with a reflux condenser, a mixed solvent of methanol (450 g) with water (450 g) was charged and subsequently 100 g of a-naphthoquinone and 10 g of sodium hydroxide were charged. Then, the internal temperature of the reaction vessel was raised to 50° C. and the mixture in the reaction vessel was reacted at 50° C. for 24 hours, followed by cooling the same to room temperature. Thus, a solution of Condensation Product No. 9 was obtained. The Condensation Product No. 9 had a weight-average molecular weight of 3,000.

Production Example 10
Production of Condensation Product No. 10:

In a 20 L internal volume reaction vessel having a reflux condenser, 1.5 kg of 1-naphthol and 7.5 L of toluene were put, and the mixture obtained was heated with stirring until the toluene became refluxed. Under reflux at this temperature, 930 ml of sulfur monochloride was added dropwise over a period of 6 hours, and thereafter the mixture obtained was kept for 1 hour at that temperature. After the reaction mixture was cooled, 5 L of hexane was added with stirring to cause the reaction product to precipitate. Thereafter, the reaction product was filtered, and then dried to obtain Condensation Product No. 10. The Condensation Product No. 10 had a weight-average molecular weight of 1,200.

Production Example 11
Production of Condensation Product No. 11:

In a 20 L internal volume reaction vessel having a reflux condenser, 6.7 L of water, 1,786 g (9.5 mols) of 6-hydroxy-2-naphthoic acid, 55 g (0.5 mol) of resorcinol and 620 g (15.5 mols) of NaOH were put, and thereafter the mixture obtained was heated to 50° C. with stirring. At the time it reached 50° C., 1.0 L of an aqueous 30 w/v % formaldehyde solution (formaldehyde: 10 mols) was added dropwise over a period of 1 hour. During the addition, the internal temperature of this reaction vessel was so controlled not to become higher than 55° C. Next, the reaction mixture thus obtained was heated to 85° C., and was allowed to react at 85° C. for 3 hours. Thereafter, the reaction mixture obtained was cooled to obtain an alkaline solution of a condensation product (Condensation Product No. 11). The Condensation Product No. 11 had a weight-average molecular weight of 2,200.

Preparation of First Coating Liquid

Preparation of first coating liquids Nos. 101–126:

Using a conjugated π bond compound, pH adjuster and solvent shown in Table 1, first layer forming first coating liquids were so prepared as to meet the conditions shown in Table 1 [conjugated π bond compound (A), auxiliary agent (B), pH adjuster, (A)/(B) weight ratio, (A)+(B) total concentration, solvent composition, and pH]. In the table, the coating liquid No. 102 is a comparative coating liquid containing a polymer scale preventive agent in a low concentration, to be used for spray coating.

As to the coating liquids employing the water-soluble polymeric compound, the water-soluble polymeric compound (D) was so slightly soluble at room temperature that the solvent was heated to about 70° C. to dissolve the compound.

Preparation of Coating Liquids Nos. 127–131:

The following compounds I to V were used as a conjugated π bond compound.

I: phenanthrene-1,2-quinone

II: flavonol

III: phenothiazine

IV: 1,8-diaminonaphthalene

V: anthraquinoneacrydone

Using a compound above, pH adjuster and solvent shown in Table 1, first coating liquids were so prepared as to meet the conditions shown in Table 2 [conjugated π bond compound (A), auxiliary agent (B), pH adjuster, (A)/(B) weight ratio, (A)+(B) total concentration, solvent composition, and pH]. In the following table, the condensation product is simply called "CP". For example, "C.P 9" stands for "Condensation Product No. 9".

TABLE 1

| First coating liquid No. | Conjugated π bond compound (A) | Auxiliary agent (B) | pH adjuster | (A)/(B) (weight ratio) | Coating liquid concentration (wt. %) | Solvent | Coating liquid pH |
|---|---|---|---|---|---|---|---|
| 101 | CP9 | none | NaOH | — | 5 | water | 12.5 |
| 102 | CP9 | colloidal silica | NaOH | 100/100 | 0.5 | water | 10.5 |
| 103 | CP1 | none | NaOH | — | 3.5 | water/methanol 60/40 | 9.5 |
| 104 | CP2 | none | KOH | — | 3.5 | water | 13.0 |
| 105 | CP3 | none | NaOH | — | 2.5 | water | 12.5 |
| 106 | CP4 | none | ethylene diamine | — | 5 | water/methanol 70/30 | 9.0 |
| 107 | CP5 | none | NaOH | — | 4 | water | 13.0 |
| 108 | CP6 | none | KOH | — | 4 | water | 12.0 |
| 109 | CP7 | none | nitric acid | — | 4 | water | 4.5 |
| 110 | CP8 | none | NaOH | — | 4 | water | 12.5 |
| 111 | CP9 | none | ethylene diamine | — | 3.5 | water | 12.0 |
| 112 | CP10 | none | NaOH | — | 5 | water | 12.0 |
| 113 | CP11 | none | NaOH | — | 5 | water | 12.5 |
| 114 | CP10 | none | none | — | 5 | N-methyl-2-pyrrolidone | — |

Preparation of Second Coating liquid

Preparation of Second Coating Liquids Nos. 201–218:

Using an auxiliary agents (B), pH adjuster and solvent shown in Tables 3 and 4, auxiliary agent-containing coating liquids (second coating liquids) were so prepared as to meet the conditions shown in Tables 3 and 4 [auxiliary agents (B), (1)/{(2), (3) or (4)} weight ratio, total concentration of (B), solvent, pH adjuster, and pH]. In the table, the coating liquid No. 202 is a comparative coating liquid containing a polymer scale preventive agent in a relatively low concentration, to be used for spray coating.

TABLE 2

| First coating liquid No. | Conjugated π bond compound (A) | Auxiliary agent (B) | pH adjuster | (A)/(B) (weight ratio) | Coating liquid concentration (wt. %) | Solvent | Coating liquid pH |
|---|---|---|---|---|---|---|---|
| 115 | I | none | ethylene diamine | — | 5 | water | 12.5 |
| 116 | II | none | NaOH | — | 5 | water | 12.5 |
| 117 | III | none | none | — | 5 | methanol | — |
| 118 | VI | none | none | — | 5 | methanol | — |
| 119 | V | none | none | — | 5 | N-methyl-2-pyrrolidone | — |

TABLE 3

| Coating liquid No. | Auxiliary agents (B) | | | | (1)/ [(2), (3) or (4)] weight ratio | Coating liquid concentration (wt. %) of (B) | Solvent | pH adjuster | Coating liquid pH |
| | Water-soluble polymeric compound (1) | Inorganic colloid (2) | Inorganic salt (3) | Acid (4) | | | | | |
|---|---|---|---|---|---|---|---|---|---|
| 201 | polyvinyl pyrrolidone | — | — | — | — | 1.5 | water | none | 7.5 |
| 202 | polyvinyl pyrrolidone | colloidal silica | — | — | 100/50 | 0.6 | water | none | 8.5 |
| 203 | — | colloidal silica | — | — | — | 3.0 | water | none | 9.5 |
| 204 | — | — | water glass | — | — | 1.5 | water | none | 12.5 |
| 205 | — | — | — | phytic acid | — | 2.0 | water/methanol 70/30 | none | 1.3 |
| 206 | polyvinyl alcohol | — | — | — | — | 2.0 | water | none | 7.5 |
| 207 | gelatin | — | — | — | — | 1.0 | water | NaOH | 8.5 |
| 208 | pectic acid | — | — | — | — | 1.5 | water | none | 7.0 |
| 209 | casein | — | — | — | — | 3.5 | water/ethanol 90/10 | KOH | 7.5 |

TABLE 4

| Coating liquid No. | Auxiliary agents (B) | | | | (1)/ [(2), (3) or (4)] weight ratio | Total concentration (wt. %) of (B) | Solvent | pH adjuster | Coating liquid pH |
| | Water-soluble polymeric compound (1) | Inorganic colloid (2) | Inorganic salt (3) | Acid (4) | | | | | |
|---|---|---|---|---|---|---|---|---|---|
| 301 | polyvinyl pyrrolidone | colloidal silica | — | — | 100/50 | 1.5 | water | ethylene diamine | 9.0 |
| 302 | polyvinyl pyrrolidone | — | calcium pyrophosphate | — | 100/10 | 1.1 | water | none | 7.0 |
| 303 | polyvinyl pyrrolidone | — | — | phytic acid | 100/100 | 2.0 | water | none | 1.5 |
| 304 | polyvinyl pyrrolidone | — | — | sulfuric acid | 100/50 | 1.5 | water | none | 1.0 |
| 305 | gelatin | colloidal silica | — | — | 100/100 | 1.0 | water | NaOH | 9.0 |
| 306 | gelatin | — | — | phosphoric acid | 100/50 | 1.5 | water | none | 1.5 |
| 307 | polyacrylic acid | — | calcium pyrophosphate | — | 100/20 | 1.2 | water | none | 2.5 |
| 368 | polyacrylic acid | — | — | tannic acid | 100/100 | 2.0 | water | none | 1.0 |
| 309 | pectic acid | — | — | phosphomolybdenic acid | 100/50 | 1.5 | water | none | 1.0 |

Example 1

Figure 2:
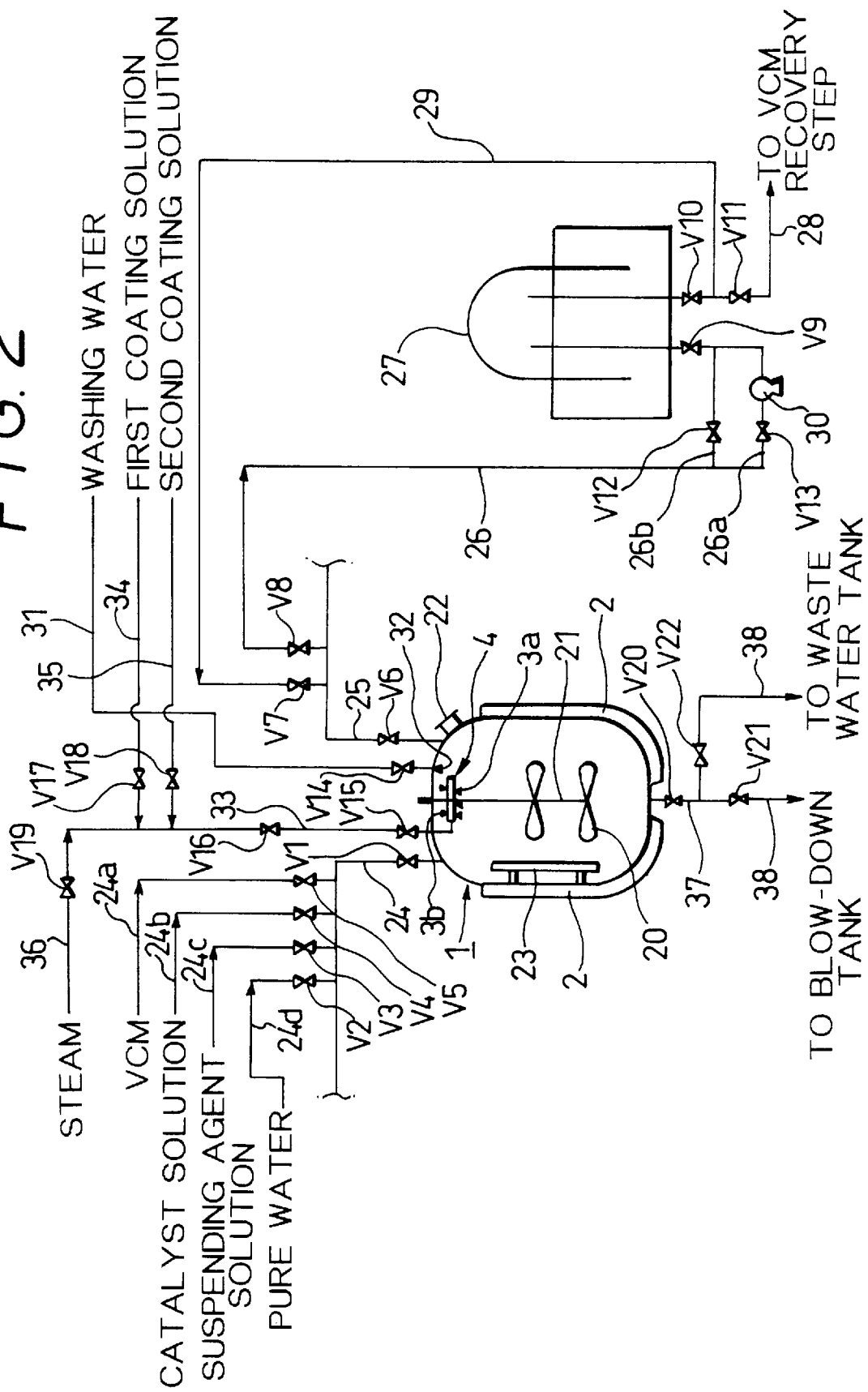
FIG. 2 schematically illustrates the arrangement in another polymerization apparatus.

FIG. 2 schematically illustrates the arrangement of a polymerization apparatus. In respect to a polymerization vessel, the same elements as in FIG. 1 are denoted with the same numerals. The following experiments were made using a polymerization apparatus shown in FIG. 2. In FIG. 2, a 2 m$^3$ internal volume polymerization vessel 1 made of SUS 316L stainless steel is equipped with a stirrer 21 having stirring blades 20 (a stirring motor is not shown), a heating-cooling jacket 2, a manhole 22, a baffle 23 and other fittings (not shown) usually providing for polymerization vessels for polymerizing vinyl chloride. A line 24 connected to the upper part of the polymerization vessel 1 is a line for charging materials. To the line 24, branch lines such as a vinyl chloride monomer (VCM) charging line 24a, a catalyst solution charging line 24b, a suspending agent charging line 24c and a pure-water charging line 24d are connected as shown in FIG. 2. This charging lines 24 and 24a–24d are provided with valves V1, V2, V3, V4 and V5 at the positions shown in the drawing. A line 25 also connected to the upper part of the polymerization vessel 1 is provided in order to evacuate the inside of the polymerization vessel 1 and to recover monomers, and is led to a gas holder 27 through a line 26 branched from the line 25. A monomer recovery line 28 is led out of the gas holder 27, and a line 29 led out of the gas holder 27 is connected to the line 25 so as to be used in pressure equalization described later. These lines 25, 26, 28 and 29 are provided with valves V6, V7, V8, V9, V10, V11, V12 and V13. The line 26 is branched into a line 26a provided with a vacuum pump 30 so that monomers can be recovered and a line 26b with no pump, and thereafter the branched lines are joined together to form a single line which is connected to the gas holder 27. To the upper part of the polymerization vessel, a line 31 is also connected in order to wash the inside of the polymerization vessel with water. The line 31 is provided with valves 14 at the position shown in the drawing and has a nozzle 32 at the end introduced inside the vessel. To the upper part of the polymerization vessel 1, a first coating liquid feed line 34 and a second coating liquid feed line 35 are connected to a coating liquid feed line 33 through valves as shown in the drawing. Further, to the line 33 a steam feed line 36 is connected via a valve. The line 33 is provided at its end located inside the vessel with a coating ring 4 to which coating nozzles 3a, 3b are attached. These lines are provided with valves V15, V16, V17 and V18 at the positions shown in the drawing. The steam feed line 36 is provided with a valve 19 at the position shown in the drawing. To the bottom of the polymerization vessel 1, a line 37 is connected, which is branched into a line 38a through which monomer slurry is led to a blow-down tank and a line 38b through which the coating liquids or washing water is discharged. The lines 38, 38a and 38b are provided with valves V20, V21 and V22 at the positions shown in the drawing.

The coating liquids used in each experiment are shown by number in Table 5. The coating liquids were coated previously on the polymerization vessel inner wall surfaces and others in the manner as described below, followed optionally by drying to form a coating film. In the polymerization vessel, vinyl chloride monomers were polymerized in the manner as described below.

(1) Coating and Drying:

The coating film is formed on the inner wall surfaces and others of the polymerization vessel of the polymerization apparatus shown in FIG. 2, by a method of a), b), c) or d) below. Methods a), b) and c) are methods of comparative examples. In the initial stage of each method, all of the valves are closed.

a) One-stage Spray Coating and Drying:

Hot water is passed through the jacket 2 to keep the polymerization vessel 1 inner wall surfaces heated to a temperature of 70° C. (Time for preheating with the jacket: 10 minutes). The valves V17, V16, V15, V20 and V22 are opened, and the first coating liquid containing a polymer scale preventive agent is coated at a flow rate of 5 L(liter)/min for 1.5 minutes. The valves V17, V16, V15, V20 and V22 are closed, and then the valves V6, V8, V13, and V9 are opened, where the vacuum pump 30 is actuated to evacuate the inside to −700 mmHg and the wet coating is dried (drying is necessary; drying time: 25 minutes) to form a coating film. Thereafter, the vacuum pump is stopped and the valves V8, V13, and V9 are closed. Next, the valves V7 and V10 are opened to make the internal pressure of the polymerization vessel 1 equal to the internal pressure of the gas holder 27. Thereafter, the valves V6, V7 and V10 are closed. The feeding of hot water to the jacket 2 is stopped.

b) Two-stage Spray Coating and Drying:

Hot water is passed through the jacket 2 to keep the polymerization vessel 1 inner wall surfaces heated to a temperature of 70° C. (Time for preheating with the jacket: 10 minutes). The valves V17, V16, V15, V20 and V22 are opened, and the coating liquid containing a polymer scale preventive agent (for under coating) is coated at a flow rate of 5 L/min for 1.5 minutes. The valves V17, V16, V15, V20 and V22 are closed, and then the valves V6, V8, V13, and V9 are opened, where the vacuum pump 30 is actuated to evacuate the inside to −700 mmHg and the wet coating is dried (drying is necessary; drying time: 25 minutes) to form a first layer. Thereafter, the vacuum pump is stopped and the valves V8, V13, and V9 are closed. Next, the valves V7 and V10 are opened to make the internal pressure of the polymerization vessel 1 equal to the internal pressure of the gas holder 27. Thereafter, the valves V6, V7 and V10 are closed. Next, the valves V18, V16, V15, V20 and V22 are opened, and the coating liquid containing a polymer scale preventive auxiliary agent (for top coating) is coated on the above first layer at a flow rate of 5 L/min for 1.5 minutes. The valves V18, V16, V15, V22 and V20 are closed, and then the valves V6, V8, V13, and V9 are opened, where the vacuum pump 30 is actuated to evacuate the inside to −700 mm Hg and the wet coating is dried (drying is necessary; drying time: 25 minutes) to form a second layer. Thereafter, the vacuum pump is stopped and the valves V8, V13, and V9 are closed. Next, the valves V7 and V10 are opened to make the internal pressure of the polymerization vessel 1 equal to the internal pressure of the gas holder 27. Thereafter, the valves V6, V7 and V10 are closed. The feeding of hot water to the jacket 2 is stopped.

c) One-stage Steam Coating (simultaneous drying):

Hot water is passed through the jacket 2 to keep the polymerization vessel 1 inner surfaces heated to a temperature of 70° C. (Time for preheating with the jacket: 10 minutes). The valves V19, V22, V20, V15 and V16 are opened, and 4 kgf/cm$^2$ G (143° C.) of steam is blown into the polymerization vessel at a flow rate of 240 kg/Hr for 3 minutes. After the inside of the vessel is pre-heated, the valve V17 is opened, and the coating liquid containing a polymer scale preventive agent is coated at a flow rate of 0.2 L/min for 2 minutes while utilizing the steam as a carrier. Thereafter, the valves V19, V22, V20, V15, V16 and V17 are closed. The feeding of hot water to the jacket 2 is stopped.

d) Two-stage Steam Coating (simultaneous drying):

(1) Coating and Crying

Hot water is passed through the jacket 2 to keep the polymerization vessel 1 inner wall surfaces heated to a temperature of 70° C. (Time for preheating with the jacket: 10 minutes). The valves V19, V22, V20, V15 and V16 are opened, and 4 kgf/cm$^2$ G (143° C.) of steam is blown into the polymerization vessel 1 at a flow rate of 240 kg/Hr for 3 minutes. After the inside of the vessel is pre-heated, the valve V17 is opened, and the first coating liquid containing a polymer scale preventive agent (for under coating) is coated and dried simultaneously at a flow rate of 0.2 L/min for 2 minutes while utilizing the steam carrier, to form a first layer. Thereafter, the valve 17 is closed. Then the valve 18 is opened, and, on the first layer, the coating liquid containing an auxiliary agent (for top coating) is coated and dried simultaneously at a flow rate of 0.2 L/min for 1 minute while utilizing the steam carrier, to form a second layer on the first layer. Thereafter, the valves V19, V22, V20, V15, V16 and V18 are closed. The feeding of hot water to the jacket 2 is stopped.

(2) Second water washing for inside of the vessel:

The valves V14, V20, V22, V6, V7 and V10 are opened to wash the inside of the polymerization vessel with water, and the wash water is discharged to a waste water tank. The valves V14, V20 and V22 are closed.

The time for washing with water is four (4) minutes when the method a) or b) is used, and it is one (1) minute when the method c) or d) is used.

(3) Charging:

The valves V1, V2 and V3 are opened, and 200 parts by weight of pure water, 0.022 part by weight of partially saponified polyvinyl alcohol and 0.028 parts by weight of hydroxymethyl cellulose are charged into the polymerization vessel 1. The valves V1, V2, V3, V6, V7 and V10 are closed.

Next, the valves V1 and V5 are opened, and 100 parts by weight of vinyl chloride monomer (VCM) is charged. Then the valve V5 is closed. Next, with the charged materials being stirred, the valve V4 is opened, and 0.03 part by weight of t-butyl peroxyneodecanate is charged. Then the valves V1 and V4 are closed.

(4) Polymerization:

Hot water is passed through the jacket 2 to raise the temperature while stirring the materials charged. At the time the internal temperature has reached 52° C., cooling water is passed through the jacket 2 to maintain the internal temperature at 52° C., where the polymerization is carried out. At the time the internal pressure has dropped to 5 kgf/cm$^2$, the polymerization is terminated.

(5) Gas discharging:

The valves V6, V8, V12 and V9 are kept open, and gas is discharged to the gas holder 27 until the internal pressure returns to substantially the atmospheric pressure. Thereafter, the valves V12, V8 and V9 are closed. Then the valves V11 and V10 are opened, and monomers recovered in the gas holder 27 is sent to the step of recovering the VCM. Thereafter, the valves V11 and V10 are closed.

(6) Pressure equalization:

The valves V7 and V10 are opened, and the internal pressure of the polymerization vessel 1 and the internal pressure of the gas holder 27 are made equal (pressure equalization).

(7) Slurry withdrawing:

The valves V20 and V21 are opened, and polymerization slurry is withdrawn out of the vessel to the blow-down tank (not shown). The polymerization slurry withdrawn to the blow-down tank is thereafter dehydrated and dried to become a vinyl polymer product.

(8) Vessel-inside first washing:

The valve V14 is opened. The inside of the polymerization vessel is washed with water, and the wash water is sent to the blow-down tank. Thereafter, the valves V14, V20, V21, V6, V7 and V10 are closed. During this washing of the inside of the vessel, hot water is passed through the jacket 2 to keep the temperature of the polymerization vessel wall surfaces at 70° C.

The operation from the (1) coating and drying up to the (8) first washing after completion of polymerization is set as one batching. The like operation was repeated by the number of batching as shown in Table 6.

<Evaluation>

Time required to form coating films

The time taken for the formation of coating films in Examples and Comparative Examples is shown in Table 5.

Measurement of the amount of polymer scale deposited

In each experiment, after the final batching was completed, polymer scale built-up at the liquid-phase portion in the polymerization vessel and polymer scale built-up on the surfaces of stirring blades and baffles and in the vicinity of the boundary between the gas-phase portion and the liquid-phase portion were determined in the following way.

The scale deposited in an area of 10 cm×10 cm at a surface to be measured was scraped off with a spatula as completely as can be confirmed with the naked eye, and then the scraped scale was weighed on a balance. The measured value was multiplied by 100 to obtain the amount of the deposited polymer scale per area of 1 m$^2$. The results are given in Table 7.

Measurement of fish eyes

Fish eyes produced when a polymeric product obtained at the final batching in each experiment is formed into sheet, were measured by the method below. The results are given in Table 8.

A hundred (100) parts by weight of a polymer obtained, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black were mixed. The resulting mixture was kneaded at 150° C. for 7 minutes with 6 inch rolls, and then formed into a sheet 0.2 mm thick. The obtained sheet was examined for the number of fish eyes per 100 cm$^2$ by light transmission.

Measurement of luminosity index (L value)

Measurement of luminosity index (L value) of a sheet formed from a polymer obtained in each experiment was carried out, according to the method below. The results are given in Table 8.

A hundred (100) parts by weight of an obtained polymer, 1 part by weight of a tin laurate stabilizing agent (TS-101, product of Akisima Chemical Co.) and 0.5 part by weight of a cadmium organic complex stabilizing agent (C-100J, product of Katsuta Kako Co.), and 50 parts by weight of dioctyl phthalate as a plasticizer were kneaded at 160° C. for 5 minutes with a twin roll mill, and then formed into a sheet 1 mm thick. Subsequently, this sheet was placed in a molding frame measuring 4×4×1.5 cm, heated at 160° C. under a pressure of 65 to 70 kgf/cm$^2$ to prepare a test specimen. This test specimen was measured for luminosity index L in the following way.

First, the stimulus value Y of XYZ color system is determined by the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition of illumination and light reception, the condition d defined in section 4.3.1 of JIS Z 8722 is adopted. Next, from the stimulus value Y obtained, the L value is calculated based on the Hunter's color difference equation: $L=10Y^{1/2}$ described in JIS Z 8730 (1980). The greater the value of L, the higher the whiteness is evaluated, namely, the slighter the initial discoloration is evaluated.

Examination of colored particles:

A mixture of 100 parts by weight of the polymer obtained in each experiment after the final batching was completed, 2 parts by weight of a stabilizer TVS N-2000E (available from Nitto Kasei Co., Ltd.) and 20 parts by weight of a plasticizer dioctyl phthalate was thoroughly kneaded and thereafter put in a molding frame of 160 mm×130 mm×3 mm, and was subsequently pressure-molded at a temperature of 175° C. and a pressure of 35 kg/cm² to obtain a sample for examination. Samples thus obtained were examined visually on the number of colored particles. The results are shown in Table 8.

Measurement of contact angles to water after immersion in vinyl chloride monomer:

Contact angles to water of the surface of the first layer obtained after the first coating liquid was coated and the surface of the second layer obtained after the second coating liquid was coated were also determined in the following way.

a-1) Preparation of samples for one-stage spray coating:

Six test pieces of 20 mm×20 mm×thickness 1 mm made of stainless steel (SUS 316L) are stuck at equal intervals along the circumference in the vicinity of a gas-liquid boundary surface of the inner wall of the polymerization vessel.

Thereafter, according to the coating process a) described above, a coating film is formed by one-stage spray coating. Thereafter, the test pieces are taken out of the polymerization vessel. These are designated as test pieces of one-stage spray coating film.

a-2) Preparation of samples for two-stage spray coating:

i) Preparation of samples for first-layer in two-stage spray coating:

Test pieces are stuck at six positions on the inner wall 5 surface of the polymerization vessel in the same manner as in a-1). Thereafter, the coating process b) is followed, but only a first layer is formed in the polymerization vessel. Thereafter, the test pieces are taken out of the polymerization vessel. These are designated as test pieces of two-stage spray coating first layer.

ii) Preparation of samples for second-coated coating film in two-stage spray coating:

Test pieces are stuck at six positions on the inner wall surface of the polymerization vessel in the same manner as in a-1). Thereafter, according to the coating process b), a first layer is formed in the polymerization vessel and a second layer is further formed in the polymerization vessel. Thereafter, the test pieces are taken out of the polymerization vessel. These are designated as test pieces of two-stage spray coating film.

a-3) Preparation of samples for one-stage steam coating:

Test pieces are stuck at six positions on the inner wall surface of the polymerization vessel in the same manner as in a-1). Thereafter, according to the coating process c), a coating film is formed in the polymerization vessel. Thereafter, the test pieces are taken out of the polymerization vessel. These are designated as test pieces of one-stage steam coating film.

a-4) Preparation of samples for two-stage steam coating:

i) Preparation of samples for first-layer in two-stage steam coating:

Test pieces are stuck at six positions on the inner wall surface of the polymerization vessel in the same manner as in a-1). Thereafter, the coating process d) is followed, but only a first layer is formed in the polymerization vessel. Thereafter, the test pieces are taken out of the polymerization vessel. These are designated as test pieces of two-stage steam coating first layer.

ii) Preparation of samples for second-coated coating film in two-stage steam coating:

Test pieces are stuck at six positions on the inner wall surface of the polymerization vessel in the same manner as in a-1). Thereafter, according to the coating process d), a first layer is formed and a second layer is further formed in the polymerization vessel. Thereafter, the test pieces are taken out of the polymerization vessel. These are designated as test pieces of two-stage steam coating film.

Immersion of coated test pieces in vinyl chloride monomer:

A 2 liter pressure-resistant container is used which has a stirrer and on the inner wall surface of which grooves are provided to which the test pieces can be fixed. The test pieces on which the coating films have been formed in the manner as described above are fitted to the grooves of the pressure-resistant container to attach the test pieces to the inner wall surface of the container in such a way that their coated surfaces face inward (appear on the inner wall surface).

Into the pressure-resistant container to the inner wall surface of which the test pieces have been attached in this way, 600 g of water and 600 g of vinyl chloride monomer are charged, thus the test pieces are immersed in these contents. Next, the contents in the pressure-resistant container are heated to 50° C. with stirring, and are continued being stirred for 1 hour at the temperature maintained at 50° C. Next, the contents are cooled to room temperature. Simultaneously, recovery of the vinyl chloride monomer present in the pressure-resistant container is started. After the recovery of the vinyl chloride monomer is completed, the water is withdrawn from the inside of the pressure-resistant container. Next, the test pieces are detached from the inner wall surface of the pressure-resistant container, and then dried in a vacuum dryer at a drying temperature of 50 plus-minus 1° C. for a drying time of 2 hours.

After the test pieces have been dried, they are moved into a desiccator, and are left therein at 20° C. for 24 hours. Thus, test pieces for measuring the contact angles to water are obtained.

Measurement of contact angles to water:

Contact angles to water on the test pieces thus obtained were measured in air in a 20° C. room by the droplet method, using a contact angle meter (Model CA-A, manufactured by Kyowa Kaimen Kagaku K.K.). The contact angles were measure at five spots for each test piece, and an average value of the measurements on six test pieces was determined, which was regarded as the contact angles to water of the coating films obtained in the experiment.

TABLE 5

|  | Spray coating | | Steam coating | |
| --- | --- | --- | --- | --- |
|  | a) One stage | b) Two stages | c) One stage | d) Two stages |
| Jacket pre-heating time (min) | 10.0 | 10.0 | 10.0 | 10.0 |
| Steam pre-heating time | 0 | 0 | 3.0 | 3.0 |
| First-stage coating time (min) | 1.5 | 1.5 | 2.0 | 2.0 |
| First-stage drying time (min) | 25.0 | 25.0 | 0 | 0 |
| Second-stage coating time (min) | 0 | 1.5 | 0 | 1.0 |
| Second-stage drying time (min) | 0 | 25.0 | 0 | 0 |
| Water washing time (min) | 4.0 | 4.0 | 1.0 | 1.0 |
| (second washing) | | | | |
| Total time (min) | 40.5 | 67.0 | 16.0 | 17.0 |

TABLE 6

| | | First stage | | Second stage | |
| --- | --- | --- | --- | --- | --- |
| Experiment No. | Coating film forming conditions | Coating liquid No. | Contact angle after coating (°) | Coating liquid No. | Contact angle after coating (°) |
| 101 | d) Steam, 2 stages | 101 | 100 | 201 | 45 |
| 102* | c) Steam, 1 stage | 101 | 100 | none | — |
| 103* | a) Spray, 1 stage | 102 | 40 | none | — |
| 104* | a) Spray, 1 stage | none | — | 201 | 40 |
| 105* | b) Spray, 2 stages | 102 | 40 | 202 | 35 |
| 106 | d) Steam, 2 stages | 101 | 100 | 203 | 50 |
| 107 | d) Steam, 2 stages | 101 | 100 | 204 | 55 |
| 108 | d) Steam, 2 stages | 101 | 100 | 205 | 55 |
| 109 | d) Steam, 2 stages | 101 | 100 | 206 | 50 |
| 110 | d) Steam, 2 stages | 101 | 100 | 207 | 45 |
| 111 | d) Steam, 2 stages | 101 | 100 | 208 | 45 |
| 112 | d) Steam, 2 stages | 101 | 100 | 209 | 50 |
| 113 | d) Steam, 2 stages | 103 | 115 | 301 | 45 |
| 114 | d) Steam, 2 stages | 104 | 95 | 302 | 45 |
| 115 | d) Steam, 2 stages | 105 | 90 | 303 | 40 |
| 116 | d) Steam, 2 stages | 106 | 85 | 304 | 55 |
| 117 | d) Steam, 2 stages | 107 | 110 | 305 | 40 |
| 118 | d) Steam, 2 stages | 108 | 125 | 306 | 40 |
| 119 | d) Steam, 2 stages | 109 | 90 | 307 | 45 |
| 120 | d) Steam, 2 stages | 110 | 85 | 308 | 40 |
| 121 | d) Steam, 2 stages | 111 | 100 | 309 | 40 |
| 122 | d) Steam, 2 stages | 112 | 100 | 302 | 45 |
| 123 | d) Steam, 2 stages | 113 | 105 | 302 | 45 |
| 124 | d) Steam, 2 stages | 114 | 100 | 302 | 45 |
| 125 | d) Steam, 2 stages | 115 | 100 | 302 | 50 |
| 126 | d) Steam, 2 stages | 116 | 105 | 302 | 50 |
| 127 | d) Steam, 2 stages | 117 | 130 | 302 | 55 |
| 128 | d) Steam, 2 stages | 118 | 125 | 302 | 55 |
| 129 | d) Steam, 2 stages | 119 | 110 | 302 | 50 |

*: Comparative examples

TABLE 7

| Experiment No. | Number of batching | Scale build-up (g/m$^2$) | | | |
| --- | --- | --- | --- | --- | --- |
| | | Liquid phase | Vicinity of gas-liquid boundary surface | Stirring blades | Baffles |
| 101 | 200 | 0 | 0 | 0 | 1 |
| 102* | 200 | 0 | 15 | 2 | 5 |
| 103* | 200 | 0 | 0 | 8 | 13 |
| 104* | 10 | 7 | 125 | 250 | 240 |
| 105* | 200 | 0 | 0 | 7 | 10 |
| 106 | 200 | 0 | 1 | 2 | 1 |
| 107 | 200 | 0 | 1 | 2 | 3 |
| 108 | 200 | 0 | 1 | 2 | 2 |
| 109 | 200 | 0 | 0 | 1 | 2 |
| 110 | 200 | 0 | 0 | 1 | 1 |
| 111 | 200 | 0 | 0 | 1 | 1 |
| 112 | 200 | 0 | 0 | 1 | 2 |
| 113 | 200 | 0 | 0 | 0 | 0 |
| 114 | 200 | 0 | 0 | 0 | 0 |
| 115 | 200 | 0 | 0 | 0 | 0 |
| 116 | 200 | 0 | 0 | 0 | 0 |
| 117 | 200 | 0 | 0 | 0 | 0 |
| 118 | 200 | 0 | 0 | 0 | 0 |
| 119 | 200 | 0 | 1 | 3 | 3 |
| 120 | 200 | 0 | 0 | 0 | 0 |
| 121 | 200 | 0 | 0 | 0 | 0 |
| 122 | 200 | 0 | 0 | 0 | 0 |
| 123 | 200 | 0 | 0 | 0 | 0 |
| 124 | 200 | 0 | 0 | 0 | 0 |
| 125 | 200 | 0 | 2 | 1 | 3 |
| 126 | 200 | 0 | 2 | 1 | 2 |
| 127 | 200 | 0 | 2 | 1 | 2 |
| 128 | 200 | 0 | 2 | 1 | 2 |
| 129 | 200 | 0 | 2 | 1 | 2 |

*: Comparative examples

TABLE 8

Scale Build-up and Product Quality

| Experiment No. | Fish eyes (number) | Brightness luminosity index (value L) | Colored particles (number) |
| --- | --- | --- | --- |
| 101 | 1 | 73.0 | 1 |
| 102* | 7 | 72.0 | 48 |
| 103* | 6 | 72.0 | 58 |
| 104* | 85 | 71.0 | 86 |
| 105* | 4 | 72.0 | 15 |
| 106 | 3 | 73.0 | 6 |
| 107 | 3 | 73.0 | 5 |
| 108 | 3 | 73.0 | 10 |
| 109 | 1 | 73.0 | 1 |
| 110 | 1 | 73.0 | 1 |
| 111 | 1 | 73.0 | 2 |
| 112 | 1 | 73.0 | 2 |
| 113 | 2 | 73.0 | 2 |
| 114 | 2 | 73.0 | 1 |
| 115 | 2 | 73.0 | 1 |
| 116 | 2 | 73.0 | 1 |
| 117 | 2 | 73.0 | 5 |
| 118 | 2 | 73.0 | 5 |
| 119 | 3 | 73.0 | 6 |
| 120 | 2 | 73.0 | 2 |
| 121 | 1 | 73.0 | 1 |
| 122 | 1 | 73.0 | 1 |
| 123 | 1 | 73.0 | 1 |
| 124 | 1 | 73.0 | 1 |
| 125 | 3 | 73.0 | 6 |
| 126 | 4 | 73.0 | 7 |
| 127 | 3 | 73.0 | 7 |
| 128 | 3 | 73.0 | 8 |
| 129 | 4 | 73.0 | 7 |

*: Comparative examples

Example 2

In Experiments Nos. 201 to 207, the polymerization was repeated until 250th batching, under the same conditions as Experiments Nos. 101, 103*, 105*, 107, 111, 113 and 128, respectively. Here, a series of the operation from the (1) coating and drying up to the (8) first washing after completion of polymerization was set as one batching. The like operation was repeated until 250th batching. Thereafter, the amount of scale, fish eyes, luminosity index and the number of colored particles were measured in the same manner as in Example 1. The results are as shown in Table 9.

TABLE 9

| Ex. No. | Base Ex. No. | Scale build-up (g/m²) | | | | Fish eyes (number) | Luminosity index (value L) | Colored particles (number) |
| --- | --- | --- | --- | --- | --- | --- | --- | --- |
| | | Liquid phase | Vicinity of gas-liquid boundary surface | Stirring blades | Baffles | | | |
| 201 | No. 101 | 0 | 0 | 0 | 2 | 1 | 73.0 | 2 |
| 202* | No. 103* | 0 | 0 | 85 | 120 | 32 | 72.0 | 76 |
| 203* | No. 105* | 0 | 0 | 51 | 65 | 15 | 72.0 | 31 |
| 204 | No. 107 | 0 | 1 | 3 | 4 | 4 | 73.0 | 7 |
| 205 | No. 111 | 0 | 0 | 2 | 3 | 2 | 73.0 | 4 |
| 206 | No. 113 | 0 | 0 | 0 | 1 | 2 | 73.0 | 8 |
| 207 | No. 128 | 0 | 2 | 4 | 7 | 6 | 73.0 | 12 |

*Comparative examples

What is claimed is:

1. A process for producing a polymer by polymerizing in a polymerization vessel a monomer having an ethylenic double bond, wherein;

said polymerization vessel has a polymer scale preventive coating film on its inner wall surfaces and other surfaces with which the monomer comes into contact during polymerization;

said coating film comprising a first layer formed on said inner wall surfaces and other surfaces and a second layer formed on the first layer;

said first layer being formed by coating a first coating liquid containing a conjugated π bond-containing compound selected from the group consisting of an aromatic compound having 5 or more conjugated π bonds and a heterocyclic compound having 5 or more conjugated π bonds by means of steam as a carrier, and said second layer being formed by coating a second coating liquid on the first layer by means of steam as a carrier; and said second layer having a surface having a contact angle to water of less than 60° after its surface has been brought into contact with a solution of mixture of water and a vinyl chloride monomer in a weight ratio of 1:1, at 50° C. for 1 hour.

2. The process of claim 1, wherein said contact angle to water ranges from 10 to 55°.

3. The process of claim 1, wherein the first layer having been formed, has a surface having a contact angle to water of 60° or more after the surface has been brought into contact with a solution of a mixture of water and a vinyl chloride monomer in a weight ratio of 1:1 at 50° C. for 1 hour.

4. The process of claim 1, wherein said conjugated π bond-containing compound contained in the first coating liquid is an aromatic compound condensation product having a weight-average molecular weight of 500 or more.

5. The process of claim 4, wherein said aromatic compound condensation product has a weight-average molecular weight of 500 to 70,000.

6. The process of claim 4, wherein said aromatic compound condensation product is selected from the group consisting of aldehyde compound/aromatic hydroxyl compound condensation products, pyrogallol/acetone condensation products, polyhydric phenol self-condensation products, polyhydric naphthol self-condensation products, aromatic amine compound condensation products, quinone compound condensation products, and sulfide compounds of aromatic hydroxyl compounds.

7. The process of claim 4, wherein said aromatic compound condensation product is an aldehyde compound/aromatic hydroxyl compound condensation product or a quinone compound condensation product.

8. The process of claim 1, wherein said first coating liquid is a solution containing a compound selected from the group consisting of pyrogallol/acetone condensation products, polyhydric phenol self-condensation products and polyhydric naphthol self-condensation products in water or a mixed solvent of water with a hydrophilic organic solvent miscible with water, and having a pH of 2.0 to 6.5.

9. The process of claim 1, wherein said first coating liquid is a solution containing a compound selected from the group consisting of condensation products of aldehyde compound/aromatic hydroxyl compound, condensation products of an aromatic amine compound, and condensation products of a quinone compound in water or a mixed solvent of water with a hydrophilic organic solvent miscible with water, and having a pH of 7.5 to 13.5.

10. The process of claim 1, wherein said first coating liquid contains the conjugated π bond-containing compound in a concentration ranging from 1.0 to 25.0% by weight.

11. The process of claim 1, wherein said second coating liquid contains a hydrophilic compound selected from the group consisting of water-soluble polymeric compounds, inorganic colloids, inorganic salts and acids, thereby the resulting second layer containing the same.

12. The process of claim 1, wherein said second coating liquid contains a water-soluble polymeric compound selected from the group consisting of water-soluble hydroxyl group-containing polymeric compounds, water-soluble amphoteric polymeric compounds, water-soluble anionic polymeric compounds and water-soluble cationic polymeric compounds, thereby the resulting second layer containing the same.

13. The process of claim 1, wherein said second coating liquid contains a compound selected from the group consisting of alkaline metal silicates and inorganic salts of alkaline-earth metals, thereby the resulting second layer containing the same.

14. The process of claim 1, wherein said second coating liquid contains methyl cellulose, hydroxyethyl cellulose, hydroxyethyl methyl cellulose, polyvinyl alcohol, partially saponified polyvinyl alcohol, glue, casein, gelatin, chitosan, polyacrylic acid, alginic acid, polymethacrylic acid, pectic acid, carragheenin, hyaluroic acid, carboxymethyl cellulose, polyvinyl pyrrolidone or a styrene-maleic anhydride copolymer; or a colloid of oxides or hydroxides of metals selected from aluminum, titanium, zirconium, tin and iron, or colloidal silica; or magnesium carbonate, calcium carbonate, magnesium phosphate, calcium phosphate, calcium pyrophosphate, calcium dihydrogenpyrophosphate, barium phosphate, calcium sulfate, calcium borate, magnesium hydroxide, calcium hydroxide, barium hydroxide, magnesium chloride or calcium chloride; or a combination of two or more thereof, thereby the resulting second layer containing the same.

15. The process of claim 8, wherein the second coating liquid contains said hydrophilic compound in a concentration ranging from 0.01 to 20% by weight in water or a mixed solvent of water with a hydrophilic solvent miscible with water.

16. The process of claim 1, wherein both said steam used in application of said first coating liquid and said steam used in application of said second coating liquid have a temperature of 120 to 260° C. and a pressure of 2 to 35 $kgf/cm^2$ G.

17. The process of claim 16, wherein said steams have a temperature of 130 to 200° C. and a pressure of 2.8 to 20 $kgf/cm^2$ G.

18. The process of claim 1, wherein in both applications of said first coating liquid and second coating liquid, the coating liquid (L) and the steam (G) is mixed in a ratio (L/G) of from 0.01 to 1.0 in terms of flow rate ratio on the basis of weight.

19. The process of claim 18, wherein said ratio of L/G is in a range of 0.03 to 0.2.

* * * * *